US012688986B2

(12) United States Patent
Sato et al.

(10) Patent No.: US 12,688,986 B2
(45) Date of Patent: Jul. 21, 2026

(54) PRESSING OPERATION BODY AND SWITCH DEVICE

(71) Applicant: ALPS ALPINE CO., LTD., Tokyo (JP)

(72) Inventors: Hidetaka Sato, Miyagi (JP); Katsutoshi Usui, Miyagi (JP); Daichi Tomita, Miyagi (JP); Hideyuki Ishida, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 246 days.

(21) Appl. No.: 18/508,610

(22) Filed: Nov. 14, 2023

(65) Prior Publication Data

US 2024/0087825 A1 Mar. 14, 2024

Related U.S. Application Data

(63) Continuation of application No. PCT/JP2022/022832, filed on Jun. 6, 2022.

(30) Foreign Application Priority Data

Jun. 7, 2021 (JP) ................................ 2021-094898

(51) Int. Cl.
*H01H 13/48* (2006.01)
*H01H 13/52* (2006.01)

(52) U.S. Cl.
CPC ............ *H01H 13/48* (2013.01); *H01H 13/52* (2013.01)

(58) Field of Classification Search
CPC .......... H01H 13/48; H01H 13/52; H01H 5/30; H01H 13/14; H01H 3/12; H01H 13/26; H01H 2215/004; H01H 2215/034; H01H 2215/036; H01H 2221/036; H01H 2227/022; H01H 2227/026; H01H 2235/008
See application file for complete search history.

(56) References Cited

U.S. PATENT DOCUMENTS

| | | | | |
|---|---|---|---|---|
| 10,115,541 B2 * | 10/2018 | Wakuda | ................. | H01H 13/52 |
| 12,002,634 B2 * | 6/2024 | Sato | ........................ | H01H 13/48 |
| 12,374,513 B2 * | 7/2025 | Sato | ........................ | H01H 13/04 |
| 2014/0054155 A1 * | 2/2014 | Kageyama | ............. | H01H 13/48 200/512 |

FOREIGN PATENT DOCUMENTS

| | | |
|---|---|---|
| JP | 2005-056703 | 3/2005 |
| JP | 2020-071991 | 5/2020 |
| JP | 2020-144994 | 9/2020 |

OTHER PUBLICATIONS

International Search Report for PCT/JP2022/022832 mailed on Aug. 9, 2022.

* cited by examiner

*Primary Examiner* — Lheiren Mae A Caroc
(74) *Attorney, Agent, or Firm* — IPUSA, PLLC

(57) ABSTRACT

A pressing operation body includes an inversion spring having a dome shape; and a rubber stem configured to bend in response to pressing and press the inversion spring. The inversion spring includes a dome portion, and a plurality of leg portions that are extended outward from an outer peripheral edge of the dome portion. The rubber stem includes a base portion configured to support a lower edge of the rubber stem. The base portion includes a plurality of retaining portions configured to retain the plurality of leg portions of the inversion spring.

17 Claims, 35 Drawing Sheets

400A

PRESSING OPERATION BODY AND SWITCH DEVICE

CROSS-REFERENCE TO RELATED APPLICATIONS

This application is a continuation application of International Application No. PCT/JP2022/022832 filed on Jun. 6, 2022, and designated the U.S., which is based upon and claims priority to Japanese Patent Application No. 2021-094898, filed on Jun. 7, 2021, the entire contents of which are incorporated herein by reference.

BACKGROUND

1. Field of the Invention

The present disclosure relates to pressing operation bodies and switch devices.

2. Description of the Related Art

Japanese Laid-Open Patent Publication No. 2005-56703 relates to a switch including a mover having a skirt portion of rubber, and discloses a technique of providing a moving contact at a position facing a stationary contact in the mover.

SUMMARY

A pressing operation body of one embodiment includes: an inversion spring having a dome shape; and a rubber stem configured to bend in response to pressing and press the inversion spring. The inversion spring includes a dome portion, and a plurality of leg portions that are extended outward from an outer peripheral edge of the dome portion. The rubber stem includes a base portion configured to support a lower edge of the rubber stem. The base portion includes a plurality of retaining portions configured to retain the plurality of leg portions of the inversion spring.

DETAILED DESCRIPTION OF THE INVENTION

When employing a configuration including an inversion spring and a rubber dome, general existing switch devices are required to include a housing configured to support the inversion spring and the rubber dome. Thus, it is hard to reduce the number of parts of the switch device.

Hereinafter, one embodiment will be described with reference to the drawings. Note in the following description that, for the sake of convenience, a horizontal direction is an X-axis direction and a Y-axis direction, and a vertical direction (upward-downward direction) is a Z-axis direction.

Overview of Switch Device 100

Figure 1:
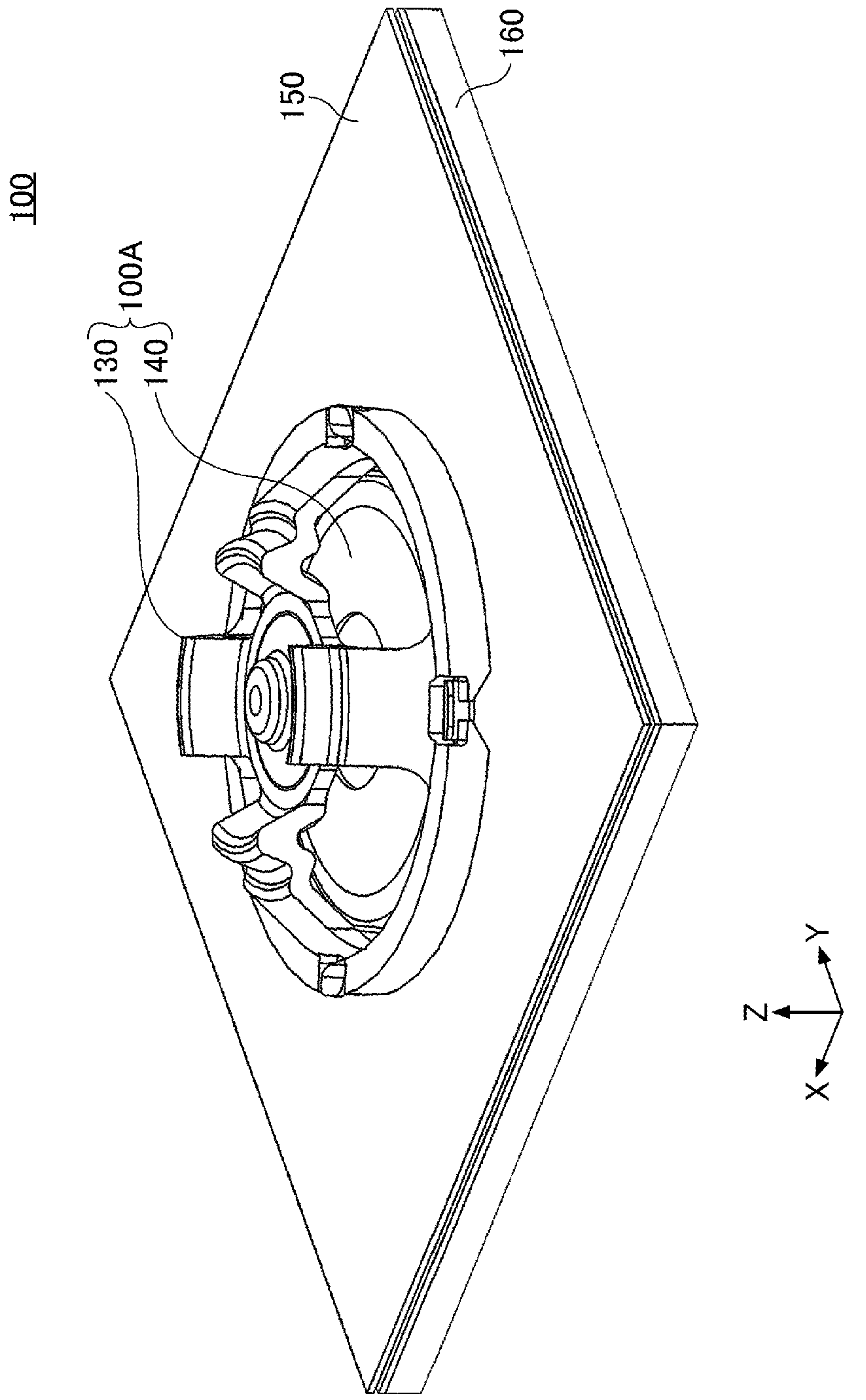
FIG. 1 is a perspective view of an outer appearance of a switch device according to one embodiment.

FIG. 1 is a perspective view of the outer appearance of a switch device 100 according to one embodiment. The switch device 100 as illustrated in FIG. 1 is a thin switch device that is used in, for example, a keyboard of a laptop and is operable by pressing. As illustrated in FIG. 1, the switch device 100 includes a membrane switch 150, and a pressing operation body 100A disposed at an upper surface of the membrane switch 150. The pressing operation body 100A includes a rubber stem 130 and a metal contact 140. The rubber stem 130 elastically deforms (bends) in response to pressing from an operator. The rubber stem 130 is configured to impart a click sensation to the pressing at this time. The metal contact 140 is provided below the rubber stem 130. The metal contact 140 is inverted in response to pressing by the rubber stem 130 that has been pressed, and presses the membrane switch 150. Thereby, the metal contact 140 can turn the membrane switch 150 to an ON state. Note that, the membrane switch 150 is layered on the upper surface of a support plate 160 having a flat-plate shape, and is supported by the support plate 160.

Configuration of the Switch Device 100

Figure 2:
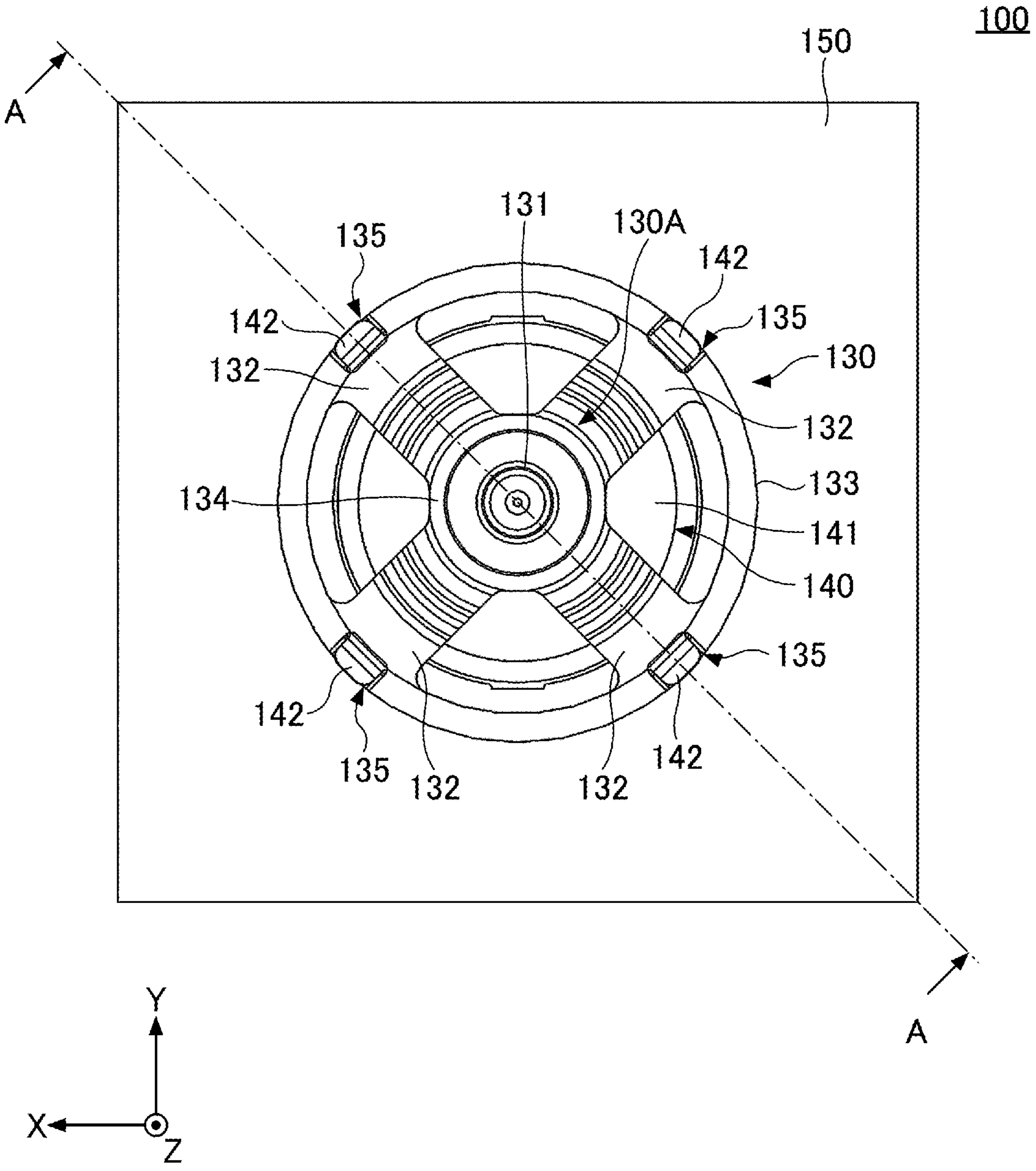
FIG. 2 is a plan view of the switch device according to one embodiment.
Figure 3:
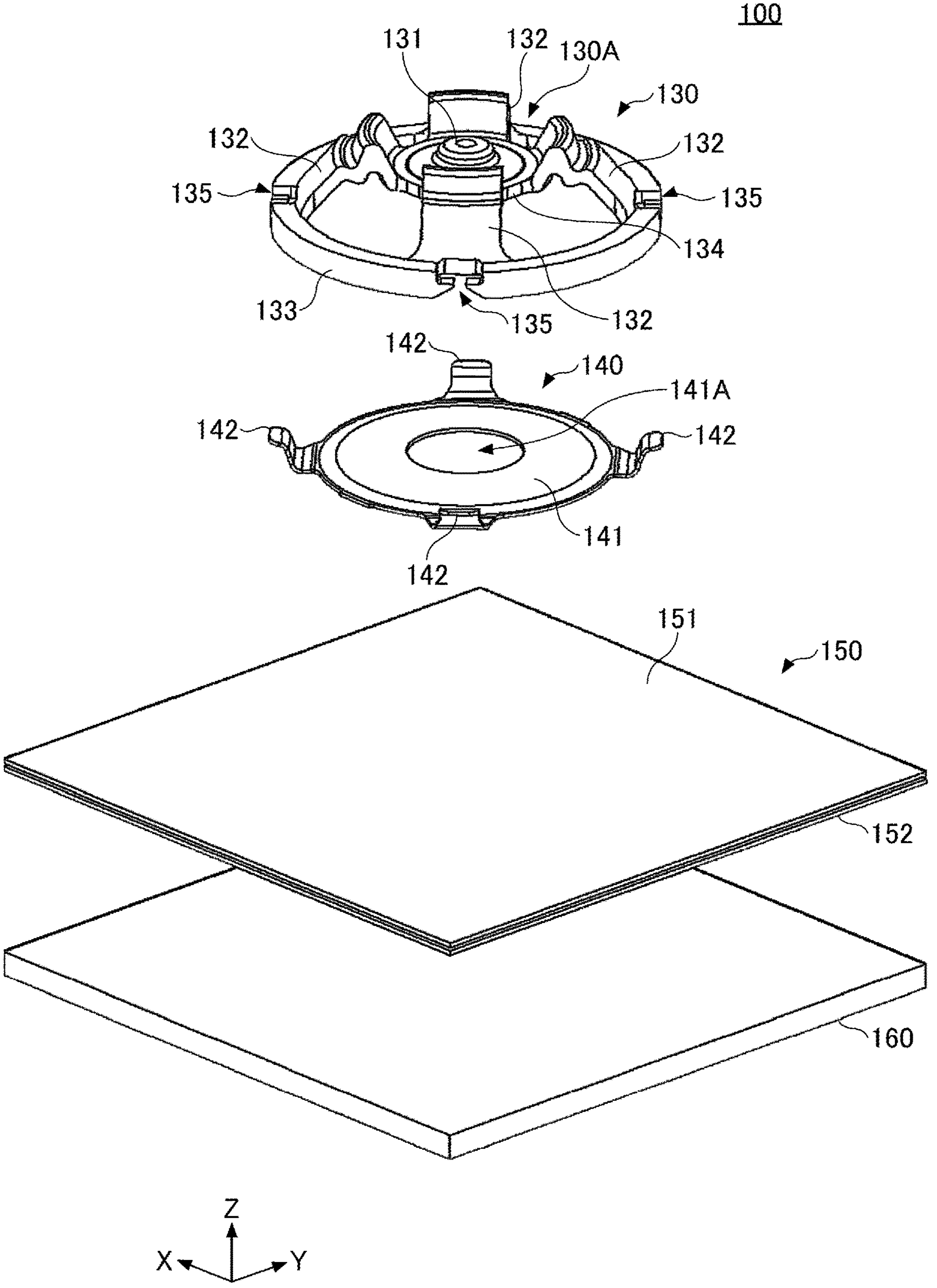
FIG. 3 is an exploded perspective view of the switch device according to one embodiment.
Figure 4:
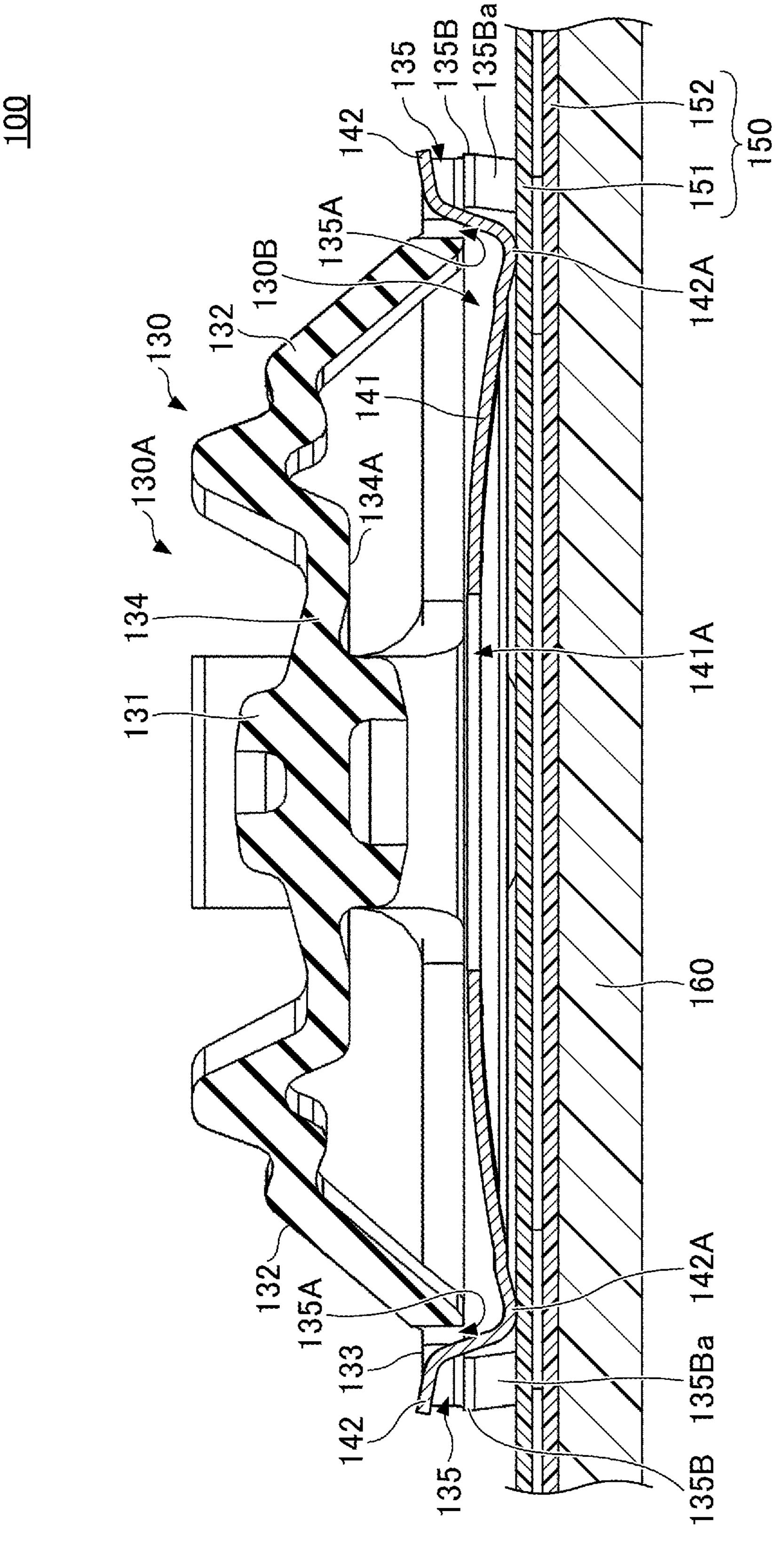
FIG. 4 is a cross-sectional view of the switch device as illustrated in FIG. 2, taken along a chain line A-A.

FIG. 2 is a plan view of the switch device 100 according to one embodiment. FIG. 3 is an exploded perspective view of the switch device 100 according to one embodiment. FIG. 4 is a cross-sectional view of the switch device 100 as illustrated in FIG. 2, taken along the chain line A-A.

As illustrated in FIG. 3 and FIG. 4, the switch device 100 includes a rubber stem 130, a metal contact 140, a membrane switch 150, and a support plate 160.

The rubber stem 130 is a member configured to be pressed downward by an operator. The rubber stem 130 is formed of an elastic material (e.g., silicone rubber). The rubber stem 130 includes a recessed portion 130A, an operating portion 131, a support leg 132, a base portion 133, and a pressing portion 134.

The recessed portion 130A has a shape that is recessed downward from the upper end of the rubber stem 130 at the center of the rubber stem 130. The recessed portion 130A has a circular shape in a plan view thereof.

The operating portion 131 is a portion configured to be pressed downward by an operator. The operating portion 131 is provided to project upward from the upper surface of the bottom of the recessed portion 130A at the center of the rubber stem 130. The operating portion 131 has an approximately cylindrical shape.

The support leg 132 has a support-leg shape that extends downward and widens outward from the upper edge of the recessed portion 130A. The support leg 132 supports the recessed portion 130A, the operating portion 131, and the pressing portion 134. The switch device 100 of the present embodiment includes four support legs 132 that are disposed at 90-degree intervals with respect to the upper edge of the recessed portion 130A. Each of the support legs 132 elastically deforms (bends) in response to pressing of the operating portion 131, and moves the operating portion 131 and the pressing portion 134 downward. This can apply an operation load to the operating portion 131. Note that, once the applied operation load has exceeded a predetermined amount, each support leg 132 is inverted and rapidly deforms into a state where the support-leg shape is collapsed. Note that, the rubber stem 130 may include three support legs 132 or five or more support legs 132 instead of the four support legs 132. Alternatively, the rubber stem 130 may include a skirt portion having a skirt shape that extends downward and widens outward from the upper edge of the recessed portion 130A.

The base portion 133 is formed to have a circular shape, and supports the bottom edges of the four support legs 132. The base portion 133 is placed on the upper surface of the membrane switch 150, and supports the entire rubber stem 130. The base portion 133 adheres, at a bottom portion thereof, to the upper surface of the membrane switch 150 by given adhesion means (e.g., a UV-curable resin) and is fixed to the upper surface of the membrane switch 150.

The base portion 133 includes four retaining portions 135 that are formed at 90-degree intervals. Each of the four retaining portions 135 has a shape that is cut out to have a certain width from outward (i.e., outer peripheral edge) to inward in a radial direction thereof. Four leg portions 142 included in the metal contact 140 are disposed in the four retaining portions 135. Thereby, the base portion 133 retains the four leg portions 142 by the four retaining portions 135. Note that, as illustrated in FIG. 4, each of the four retaining portions 135 has an opening 135A leading to a space 130B enclosed by the base portion 133 of the rubber stem 130. The leg portion 142 of the metal contact 140 is inserted from the opening 135A.

The pressing portion 134 is a horizontal disc-shaped portion provided at the center of the rubber stem 130, and is a portion to become the bottom of the above-described recessed portion 130A. The pressing portion 134 is provided on the back side of the operating portion 131 and at a position facing the top of a dome portion 141 of the metal contact 140. In response to pressing of the operating portion 131 (downward movement of the operating portion 131), the pressing portion 134 presses the top of the dome portion 141 of the metal contact 140. The lower surface of the pressing portion 134 is a contact surface 134A. In response to pressing of the operating portion 131, the pressing portion 134 presses, in the contact surface 134A, the top of the dome portion 141 of the metal contact 140.

The metal contact 140 is one example of the "inversion spring". The metal contact 140 is formed of a metal plate. The metal contact 140 includes the dome portion 141, and the four leg portions 142 that are disposed at 90-degree intervals at the outer peripheral edge of the dome portion 141.

The dome portion 141 is provided at the center of the metal contact 140. The dome portion 141 has a dome shape that has a circular shape in a plan view thereof and projects upward. The dome portion 141 is disposed in the space 130B enclosed by the base portion 133 of the rubber stem 130. The dome portion 141 deforms downward into a recessed shape when the top (center) thereof is inverted in response to pressing by the pressing portion 134 of the rubber stem 130. Thereby, the dome portion 141 presses the membrane switch 150 at a rear portion of the top thereof, and can turn the membrane switch 150 to an ON state. Note that, a circular opening 141A is provided at the center of the dome portion 141, but the opening 141A does not need to be provided.

The four leg portions 142 are disposed at 90-degree intervals at the outer peripheral edge of the dome portion 141. Each of the four leg portions 142 is provided to extend, from the outer peripheral edge of the dome portion 141, outward in a radial direction thereof and upward. As illustrated in FIG. 4, each of the four leg portions 142 is inserted into a retaining portion 135 through the opening 135A of the retaining portion 135 provided in the base portion 133 of the rubber stem 130. Thereby, the four leg portions 142 are supported by the four retaining portions 135 provided in the base portion 133 of the rubber stem 130. Also, each of the four leg portions 142 includes a folded portion 142A (see FIG. 4), which is folded in a V shape, in the vicinity of the base thereof (a portion leading to the outer peripheral edge of the dome portion 141). The folded portion 142A contacts the upper surface of the membrane switch 150. Thereby, the metal contact 140 is supported by the four leg portions 142 at the upper surface of the membrane switch 150.

The membrane switch 150 is a switch device in the form of a thin sheet. The membrane switch 150 is formed of an upper sheet 151 and a lower sheet 152 that are stacked on top of each other. At the center of the lower surface of the upper sheet 151, an unillustrated moving contact formed of a conductive film is provided. At the center of the upper surface of the lower sheet 152, an unillustrated stationary contact formed of a conductive film is provided so as to face the moving contact of the upper sheet 151. In a state where the membrane switch 150 is not pressed from the pressing portion 134 of the rubber stem 130, the moving contact of the upper sheet 151 is apart from the stationary contact of the lower sheet 152, thereby achieving an OFF state. Meanwhile, in a state where the membrane switch 150 is pressed from the pressing portion 134 of the rubber stem 130, the moving contact of the upper sheet 151 contacts the stationary contact of the lower sheet 152, thereby achieving an ON state.

The support plate 160 is a member having a flat-plate shape and being stacked on the lower surface of the membrane switch 150. The support plate 160 supports the membrane switch 150 from thereunder so that the membrane switch 150 does not entirely bend downward in response to pressing of the rubber stem 130.

Movement of the Switch Device 100

The switch device 100 as configured in the above-described manner can turn the membrane switch 150 to an ON state in response to pressing of the operating portion 131 of the rubber stem 130 downward (negative Z-axis direction).

Specifically, in the switch device 100, when the operating portion 131 of the rubber stem 130 is pressed downward, the pressing portion 134 of the rubber stem 130 moves downward while the support legs 132 of the rubber stem 130 elastically deform (bend). Then, the pressing portion 134 of the rubber stem 130 presses the top of the dome portion 141 of the metal contact 140. Once the load applied to the dome portion 141 of the metal contact 140 has exceeded a threshold, the dome portion 141 of the metal contact 140 is rapidly inverted. This inversion imparts a click sensation to the pressing of the operating portion 131, and the rear portion of the top of the dome portion 141 of the metal contact 140 presses the membrane switch 150. As a result, the membrane switch 150 is turned to an ON state.

Meanwhile, in the switch device 100, once the pressing of the rubber stem 130 has been released, the rubber stem 130 returns to the original unbent state by its own elastic force. Also, the metal contact 140 returns to the original projecting shape by its own spring force. Thereby, the pressing of the metal contact 140 against the membrane switch 150 is released. As a result, the membrane switch 150 is turned to an OFF state.

Detailed Configuration of the Retaining Portion 135

Figure 5:
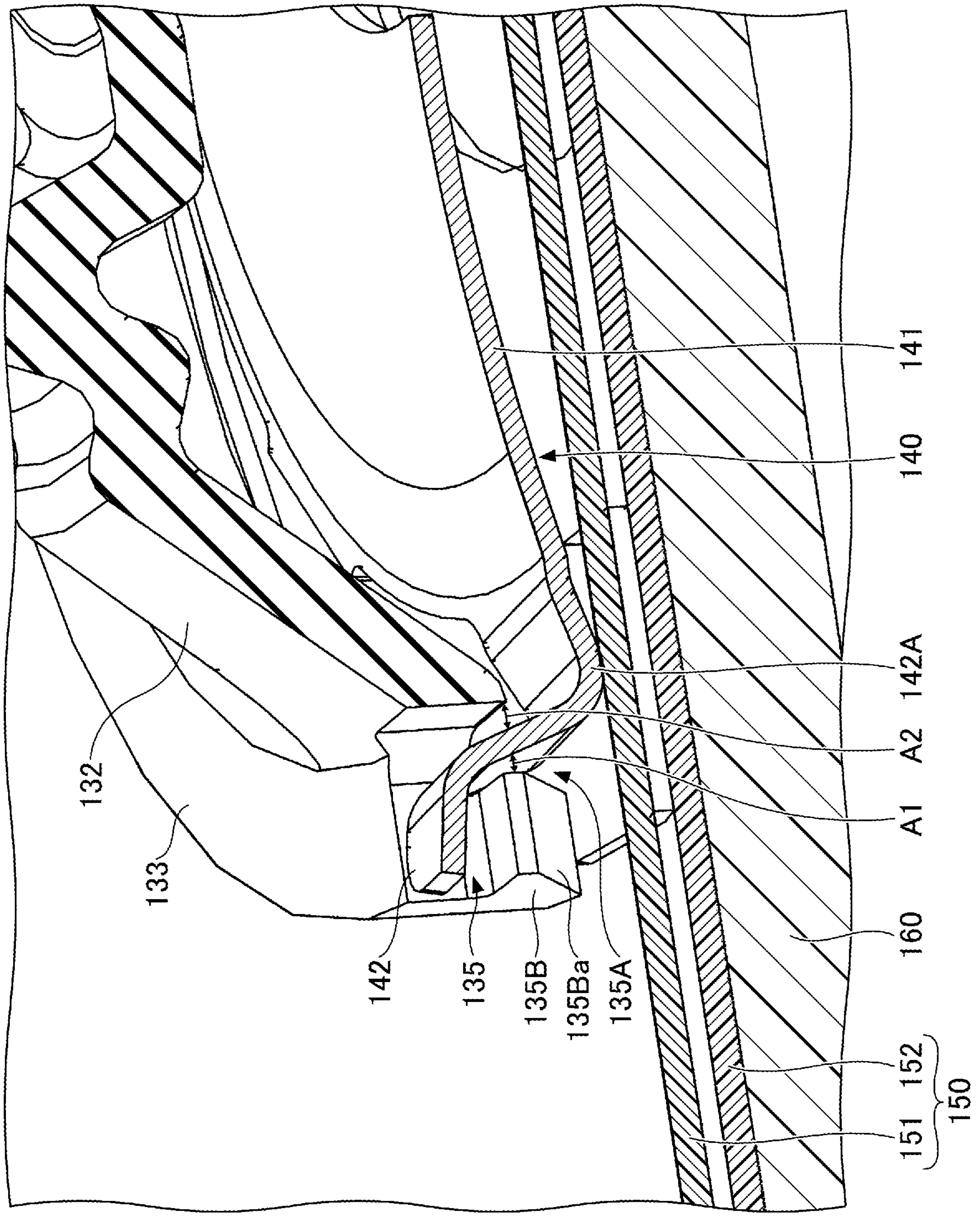
FIG. 5 is a partially enlarged cross-sectional view of the switch device according to one embodiment.

FIG. 5 is a partially enlarged cross-sectional view of the switch device 100 according to one embodiment. As illustrated in FIG. 4 and FIG. 5, the retaining portion 135 includes a pair of projecting portions 135B having a tongue-like shape and facing each other. The pair of projecting portions 135B are positioned at the lower end in the upward-downward direction (Z-axis direction) and outward of the opening 135A in the radial direction. The pair of projecting portions 135B are provided to project from a pair of inner wall surfaces of the retaining portion 135 that face each other. Each of the projecting portions 135B is formed integrally with the base portion 133 of the rubber stem 130. Thus, the projecting portion 135B is elastically deformable so that the tip thereof bends in the upward-downward direction (Z-axis direction). Note that, the gap width between the pair of projecting portions 135B is narrower than the width of the leg portion 142 of the metal contact 140.

Because the retaining portion 135 includes the pair of projecting portions 135B that are elastically deformable, the leg portion 142 of the metal contact 140 can be readily disposed in the retaining portion 135. Specifically, only by pushing the leg portion 142 of the metal contact 140 in the pair of projecting portions 135B upward from thereunder, the pair of projecting portions 135B elastically deform so as to bend upward, and the leg portion 142 of the metal contact 140 passes through the gap between the pair of projecting portions 135B. In this way, the leg portion 142 can be readily disposed in the retaining portion 135.

At this time, as illustrated in FIG. 4 and FIG. 5, the tip of each of the pair of projecting portions 135B has a tilt surface 135Ba that is tilted facing downward such that the gap width between the pair of projecting portions 135B becomes gradually narrower in the upward direction. Therefore, when the leg portion 142 of the metal contact 140 is pushed in the gap between the pair of projecting portions 135B from thereunder, it is possible to readily widen the gap between the pair of projecting portions 135B.

Note that, because the gap width between the pair of projecting portions 135B is narrower than the width of the leg portion 142 of the metal contact 140, the leg portion 142 disposed in the retaining portion 135 is restricted by the pair of projecting portions 135B from moving downward, and does not tend to fall out of the retaining portion 135. That is, the pair of projecting portions 135B function as a "support portion" configured to support the tip of the leg portion 142 disposed in the retaining portion 135 from thereunder (negative Z-axis side).

Note that, as illustrated in FIG. 4 and FIG. 5, in a state where the leg portion 142 of the metal contact 140 is in contact with the upper surface of the membrane switch 150, the leg portion 142 of the metal contact 140 is not fixed to the retaining portion 135, and in the opening 135A of the retaining portion 135, the leg portion 142 does not contact the wall surface forming the opening 135A both outward in the radial direction and inward in the radial direction (that is, there are a gap A1 and a gap A2 (see FIG. 5)). Also, the tip of the leg portion 142 of the metal contact 140 is apart upward from the pair of projecting portions 135B. Thereby, according to the pressing operation body 100A according to one embodiment, movement in the radial direction of the leg portion 142 of the metal contact 140 in the opening 135A is not inhibited upon inversion of the metal contact 140, and the operation sensation generated by the metal contact 140 is not affected.

As described above, the pressing operation body 100A according to one embodiment includes the metal contact 140 having a dome shape, and the rubber stem 130 configured to bend in response to pressing and press the metal contact 140. The metal contact 140 includes the dome portion 141, and the plurality of leg portions 142 that are extended outward from the outer peripheral edge of the dome portion 141. The rubber stem 130 includes the base portion 133 configured to support the lower edge of the rubber stem 130. The base portion 133 includes the plurality of retaining portions 135 configured to retain the plurality of leg portions 142 of the metal contact 140.

Thereby, the pressing operation body 100A according to one embodiment can support the metal contact 140 by the rubber stem 130 without a housing unlike before. Therefore, according to the pressing operation body 100A according to one embodiment, it is possible to reduce the number of parts of the switch device 100 including the metal contact 140 and the rubber stem 130.

Also, in the pressing operation body 100A according to one embodiment, the retaining portion 135 has a shape that is formed by cutting out a part of the base portion 133.

Thereby, the pressing operation body 100A according to one embodiment can form the plurality of retaining portions 135 in the base portion 133 without increasing the size of the base portion 133.

Also, in the pressing operation body 100A according to one embodiment, the leg portion 142 includes the folded portion 142A that is folded in a V shape after the leg portion 142 is extended outward and downward from the outer peripheral edge of the dome portion 141. The leg portion 142 is extended outward and upward from the folded portion 142A, and the tip thereof is disposed in the retaining portion 135. The retaining portion 135 includes a support portion configured to support the tip of the leg portion 142 disposed in the retaining portion 135 from thereunder.

Thereby, according to the pressing operation body 100A according to one embodiment, the leg portion 142 disposed in the retaining portion 135 is supported by the support portion, and can be prevented from tending to fall out of the retaining portion 135.

Also, in the pressing operation body 100A according to one embodiment, the support portion is the pair of projecting portions 135B that are provided in the retaining portion 135 so as to project, are elastically deformable, and face each other.

Thereby, according to the pressing operation body 100A according to one embodiment, only by pushing the leg portion 142 of the metal contact 140 in the gap between the pair of projecting portions 135B upward from thereunder, the pair of projecting portions 135B elastically deform so as to bend upward, and the leg portion 142 of the metal contact 140 passes through the gap between the pair of projecting portions 135B. In this way, the leg portion 142 of the metal contact 140 can be readily disposed in the retaining portion 135.

Also, the pressing operation body 100A according to one embodiment has the gap between the pair of projecting portions 135B, and the tips of the pair of projecting portions 135B each have a tilt surface 135Ba that is tilted so that the width of the gap between the pair of projecting portions 135B becomes gradually narrower in the upward direction.

Thereby, according to the pressing operation body 100A according to one embodiment, when the leg portion 142 of the metal contact 140 is pushed in the gap between the pair of projecting portions 135B from thereunder, it is possible to readily widen the gap between the pair of projecting portions 135B.

Also, in the pressing operation body 100A according to one embodiment, the retaining portion 135 retains the leg portion 142 of the metal contact 140 so as to be movable in the retaining portion 135 in response to pressing.

Thereby, according to the pressing operation body 100A according to one embodiment, it is possible for the operation sensation generated by the metal contact 140 upon pressing not to be affected.

Also, the switch device 100 according to one embodiment includes the pressing operation body 100A and the membrane switch 150 disposed below the pressing operation body 100A. The membrane switch 150 is turned to an ON state through inversion of the metal contact 140.

Thereby, the switch device 100 according to one embodiment can support the metal contact 140 by the rubber stem 130 without a housing unlike before. Therefore, it is possible to reduce the number of parts of the switch device 100.

First Modified Example

Figure 6:
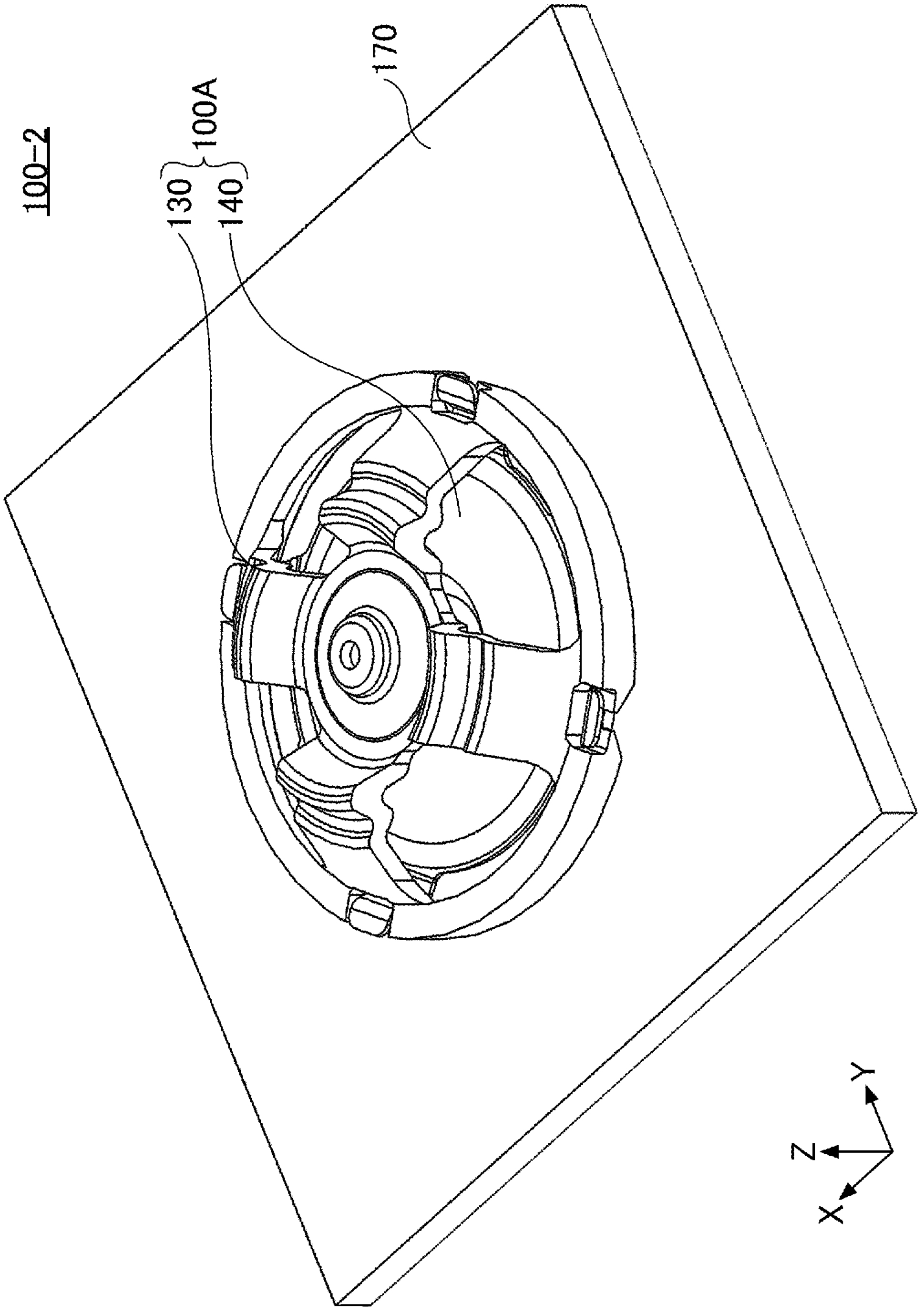
FIG. 6 is a perspective view of an outer appearance of a switch device according to a first modified example.
Figure 7:
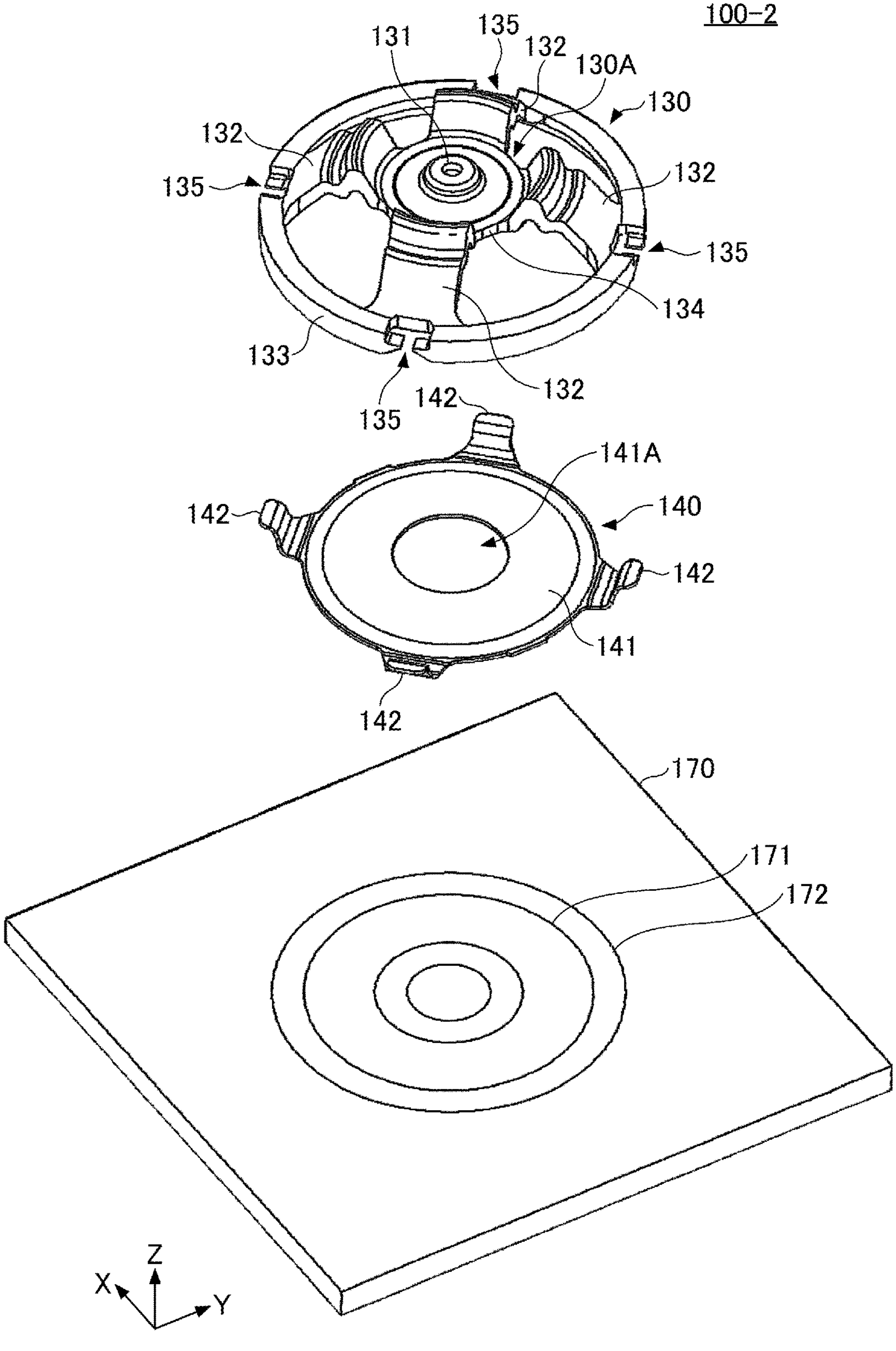
FIG. 7 is an exploded perspective view of the switch device according to the first modified example.
Figure 8:
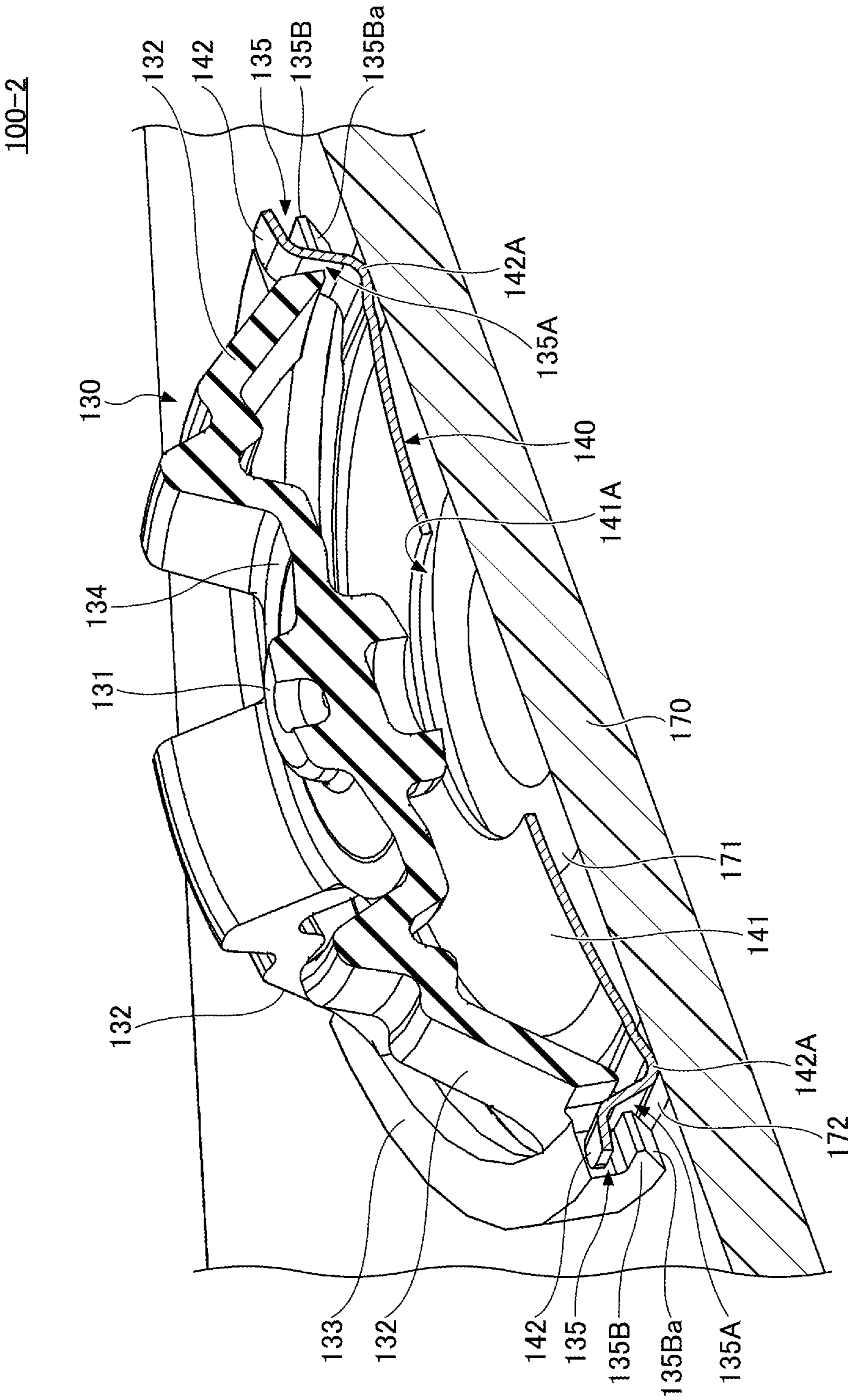
FIG. 8 is a partially enlarged cross-sectional view of the switch device according to the first modified example.

Next, a first modified example of the switch device 100 according to one embodiment will be described with reference to FIG. 6 to FIG. 8. FIG. 6 is a perspective view of the outer appearance of a switch device 100-2 according to the first modified example. FIG. 7 is an exploded perspective view of the switch device 100-2 according to the first modified example. FIG. 8 is a partially enlarged cross-sectional view of the switch device 100-2 according to the first modified example.

As illustrated in FIG. 6 to FIG. 8, the switch device 100-2 according to the first modified example is different from the switch device 100 in that the switch device 100-2 includes a board 170 instead of the membrane switch 150 and the support plate 160. Note that, the switch device 100-2 according to the first modified example uses the pressing operation body 100A that is the same as in the switch device 100.

The board 170 is a member that is formed of a resin and has a flat-plate shape. The board 170 is, for example, a printed wiring board (PWB). At the center on the upper surface of the board 170, a first stationary contact 171 and a second stationary contact 172 forming a switch circuit are provided. For example, the first stationary contact 171 and the second stationary contact 172 are formed of a conductor in the form of a thin film (e.g., a copper film). The first stationary contact 171 and the second stationary contact 172 are concentrically formed about the center of the metal contact 140. The first stationary contact 171 has a smaller diameter than the second stationary contact 172. As illustrated in FIG. 8, the four leg portions 142 of the metal contact 140 are in contact with the second stationary contact 172. Thereby, the metal contact 140 is always electrically connected to the second stationary contact 172. The base portion 133 of the rubber stem 130 adheres, at a bottom portion thereof, to the upper surface of the board 170 by given adhesion means (e.g., a UV-curable resin) and is fixed to the upper surface of the board 170.

According to the switch device 100-2 as configured in the above-described manner, the switch circuit provided on the board 170 can be turned to an ON state in response to pressing of the operating portion 131 of the rubber stem 130 downward (negative Z-axis direction).

Specifically, in the switch device 100-2, when the operating portion 131 of the rubber stem 130 is pressed downward, the pressing portion 134 of the rubber stem 130 moves downward while the support leg 132 of the rubber stem 130 elastically deforms (bends). Then, the pressing portion 134 of the rubber stem 130 presses the top of the dome portion 141 of the metal contact 140. Once the load applied to the dome portion 141 of the metal contact 140 has exceeded a threshold, the dome portion 141 of the metal contact 140 is rapidly inverted. This inversion imparts a click sensation to the pressing of the operating portion 131, and the rear portion of the top of the dome portion 141 of the metal contact 140 contacts the first stationary contact 171. As a result, the first stationary contact 171 and the second stationary contact 172 are electrically connected via the metal contact 140, and the switch circuit provided on the board 170 is turned to an ON state.

Meanwhile, in the switch device 100-2, once the pressing of the rubber stem 130 has been released, the rubber stem 130 returns to the original unbent state by its own elastic force. Also, the metal contact 140 returns to the original projecting shape by its own spring force. Thereby, the pressing of the metal contact 140 against the first stationary contact 171 is released. As a result, the switch circuit provided on the board 170 is turned to an OFF state.

As described above, the switch device 100-2 according to the first modified example includes the pressing operation body 100A and the board 170 disposed below the pressing operation body 100A. The board 170 includes the stationary contacts 171 and 172 that are turned to a conduction state through inversion of the metal contact 140.

Thereby, the switch device 100-2 according to the first modified example can support the metal contact 140 by the rubber stem 130 without a housing unlike before. Therefore, it is possible to reduce the number of parts of the switch device 100-2.

In the above, one embodiment of the present invention has been described in detail. However, the present invention should not be construed as being limited to the above-described embodiment. Various modifications or changes are possible in the scope of the gist of the present invention that is recited in claims.

For example, in the pressing operation body 100A according to one embodiment, the shape of the inner peripheral edge of the base portion 133 may be circular in conformity to the rubber stem 130, and the shape of the outer peripheral edge of the base portion 133 may be rectangular. In this case, the retaining portion 135 may be provided near each of the four corners of the base portion 133. Thereby, the pressing operation body 100A according to one embodiment can form a plurality of retaining portions 135 in the extra spaces of the four corners of the base portion 133 without increasing the size of the base portion 133.

Second Modified Example

Figure 9:
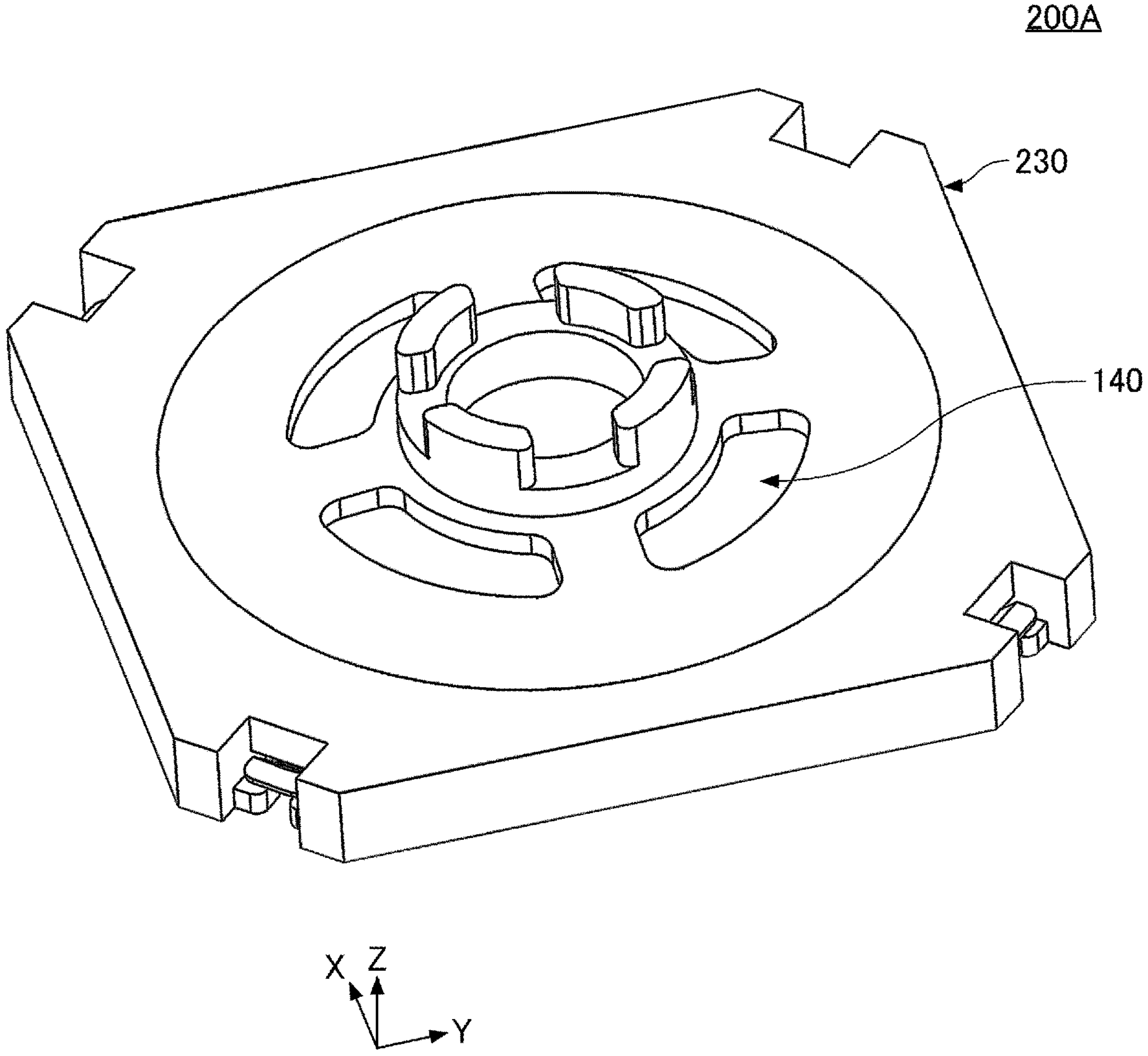
FIG. 9 is a perspective view of an outer appearance of a pressing operation body according to a second modified example.
Figure 10:
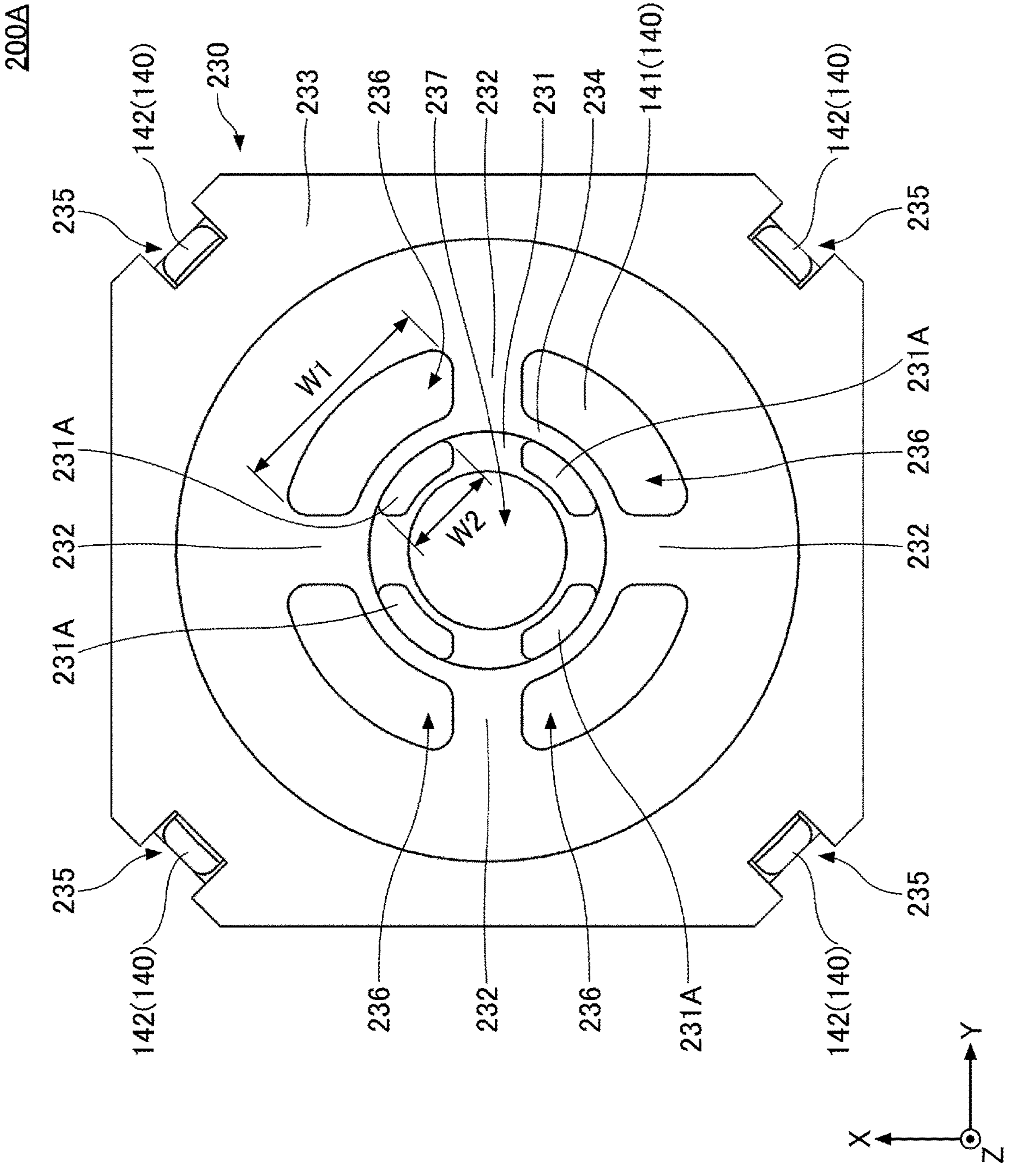
FIG. 10 is a plan view of the pressing operation body according to the second modified example.
Figure 11:
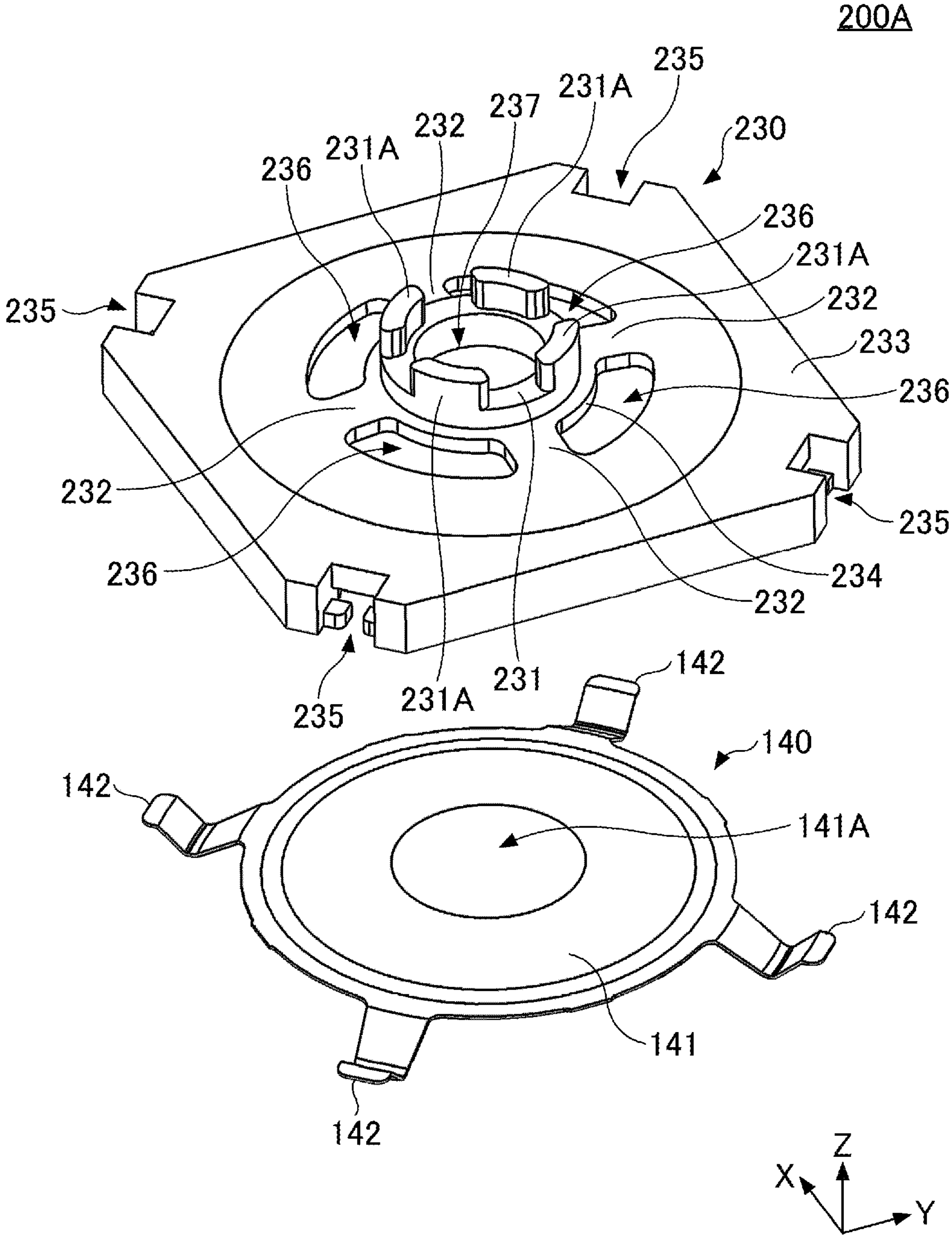
FIG. 11 is an exploded perspective view of the pressing operation body according to the second modified example.

Next, a second modified example of the switch device 100 according to one embodiment will be described with reference to FIG. 9 to FIG. 11. FIG. 9 is a perspective view of the outer appearance of a pressing operation body 200A according to the second modified example. FIG. 10 is a plan view of the pressing operation body 200A according to the second modified example. FIG. 11 is an exploded perspective view of the pressing operation body 200A according to the second modified example.

As illustrated in FIG. 9 to FIG. 11, the pressing operation body 200A according to the second modified example is different from the pressing operation body 100A in that the pressing operation body 200A includes a rubber stem 230 instead of the rubber stem 130. Note that, the metal contact 140 included in the pressing operation body 200A according to the second modified example is the same as the metal contact 140 included in the pressing operation body 100A.

Also, similar to the switch device 100 according to one embodiment, the pressing operation body 200A according to the second modified example may be combined with the membrane switch 150 and the support plate 160. Also, similar to the switch device 100-2 according to the first modified example, the pressing operation body 200A according to the second modified example may be combined with the board 170.

Because the pressing operation body 200A is thin and has a square shape, the pressing operation body 200A can be used in, for example, a square key of a keyboard of a laptop.

The rubber stem 230 is a member configured to be pressed downward by an operator. The rubber stem 230 is formed of an elastic material (e.g., silicone rubber). The rubber stem 230 has a flat-plate shape and is thinner than the rubber stem 130.

The rubber stem 230 includes an operating portion 231, four beams 232, a base portion 233, a pressing portion 234, four retaining portions 235, and four first hollowed-out portions 236.

The operating portion 231 is a portion that is provided at the center of the rubber stem 230 and configured to be pressed downward by an operator. The operating portion 231 is provided to project upward from the upper surface of the pressing portion 234, and has an approximately cylindrical shape. At the upper portion of the operating portion 231, four elastic wall portions 231A that are elastically deformable in response to pressing are disposed along the same circumference at equal intervals (i.e., 90-degree intervals). The four elastic wall portions 231A each have a thin-wall shape that is curved along the same circumference. Note that, the operating portion 231 may include three or less elastic wall portions 231A or five or more elastic wall portions 231A instead of the four elastic wall portions 231A. Alternatively, in the present modified example, the four elastic wall portions 231A are disposed to be directed toward the four retaining portions 235 (i.e., the four corners of the base portion 233) with a reference being the center of the operating portion 231. However, the disposition direction of each elastic wall portion 231A is not limited to this.

The pressing portion 234 is provided at the center of the rubber stem 230 and below the operating portion 231. In a plan view thereof, the pressing portion 234 has a circular shape that is slightly larger than the operating portion 231. The pressing portion 234 is provided at a position facing the top of the dome portion 141 of the metal contact 140. In response to pressing of the operating portion 231 (downward movement of the operating portion 231), the pressing portion 234 presses the top of the dome portion 141 of the metal contact 140 with the lower surface of the pressing portion 234.

Here, at the center of the operating portion 231 and the pressing portion 234, a second hollowed-out portion 237 that has a circular shape in a plan view thereof is formed. The second hollowed-out portion 237 penetrates the operating portion 231 and the pressing portion 234 in the upward-downward direction.

The base portion 233 is a flat-plate portion having an outer shape that is square in a plan view thereof, and enclosing the pressing portion 234. The base portion 233 is connected to the pressing portion 234 by the four beams 232. Thereby, the base portion 233 supports, inward thereof, the four beams 232 and the pressing portion 234.

The four first hollowed-out portions 236 are each formed between the inner peripheral edge of the base portion 233 and the outer peripheral edge of the pressing portion 234. The four first hollowed-out portions 236 are circularly provided along the same circumference at equal intervals (i.e., 90-degree intervals) so as to enclose the pressing portion 234. The four first hollowed-out portions 236 each have a shape that is curved along the same circumference in a plan view thereof. Thereby, between the inner peripheral edge of the base portion 233 and the outer peripheral edge of the pressing portion 234, portions excluding the four first hollowed-out portions 236 are formed as the four beams 232. Note that, the rubber stem 230 may include three or less first hollowed-out portions 236 or five or more first hollowed-out portions 236 instead of the four first hollowed-out portions 236. Also, in the present modified example, the four first hollowed-out portions 236 are disposed to be directed toward the four retaining portions 235 (i.e., the four corners of the base portion 233) with a reference being the center of the operating portion 231. However, the disposition direction of each first hollowed-out portion 236 is not limited to this. Also, the first hollowed-out portion 236 does not need to completely penetrate the base portion 233, e.g., the first hollowed-out portion 236 may be closed in the form of a thin film.

Note that, as illustrated in FIG. 10, in the present modified example, the first hollowed-out portions 236 are each provided in the same radial direction as in one corresponding elastic wall portion 231A and provided outward of one corresponding elastic wall portion 231A in the radial direction, with a reference being the center of the operating portion 231. In a direction orthogonal to the radial direction, a width W1 of the first hollowed-out portion 236 is equal to or larger than a width W2 of one corresponding elastic wall portion 231A.

The four beams 232 are provided at equal intervals (i.e., 90-degree intervals) between the inner peripheral edge of the base portion 233 and the outer peripheral edge of the pressing portion 234. Each of the four beams 232 has a flat-plate shape that has a certain width and extends in the form of a straight line from the outer peripheral edge of the pressing portion 234 outward in the radial direction thereof. Then, the beam 232 is connected to the inner peripheral edge of the base portion 233. The four beams 232 support the pressing portion 234 and the operating portion 231. Each of the four beams 232 elastically deforms (bends downward) in response to pressing of the operating portion 231, and moves the operating portion 131 and the pressing portion 134 downward. In this way, the beam 232 can apply an operation load to the operating portion 231. Note that, the rubber stem 230 may include three beams 232 or five or more beams 232 instead of the four beams 232.

The four retaining portions 235 are provided at the four corners of the base portion 233. Each of the four retaining portions 235 has a shape that is cut out toward the center of the operating portion 231 so as to have a certain width. The four leg portions 142 included in the metal contact 140 are disposed in the four retaining portions 235. Thereby, the base portion 233 retains the four leg portions 142 by the four retaining portions 235. Note that, the configuration of the retaining portion 235 included in the rubber stem 230 is the same as the configuration of the retaining portion 135 included in the rubber stem 130, and thus detailed description thereof will be omitted.

According to the rubber stem 230 according to the second modified example as configured in the above-described manner, in response to pressing of the operating portion 231 downward (negative Z-axis direction), the metal contact 140 is inverted, and an unillustrated switch circuit can be turned to an ON state.

Specifically, in the rubber stem 230 according to the second modified example, when the operating portion 231 is pressed downward, the pressing portion 234 moves downward together with the operating portion 231 while the beam 232 elastically deforms (bends downward). Then, the pressing portion 234 presses the top of the dome portion 141 of the metal contact 140. Once the load applied to the dome portion 141 of the metal contact 140 has exceeded a threshold, the dome portion 141 of the metal contact 140 is rapidly inverted. This inversion imparts a click sensation to the pressing of the operating portion 231, and the switch circuit is turned to an ON state.

Meanwhile, in the rubber stem 230 according to the second modified example, once the pressing of the operating portion 231 has been released, the operating portion 231 and the pressing portion 234 move upward and return to the initial state by the action of the elastic force of the beam 232. Also, the metal contact 140 returns to the original projecting shape by its own spring force. Thereby, the switch circuit is turned to an OFF state.

According to the rubber stem 230 according to the second modified example, which includes the second hollowed-out portion 237 inward of the pressing portion 234 and the first hollowed-out portion 236 outward of the pressing portion 234, when the operating portion 231 is pressed downward and the operating portion 231 presses the pressing portion 234, the pressing portion 234 can be pressed and widened in both directions of the inward direction and the outward direction. Therefore, it is possible to increase the compressive amount of the pressing portion 234. Thereby, even if a pressing load is relatively low, the rubber stem 230 according to the second modified example can obtain a relatively large stroke amount of the operating portion 231 (stroke amount that is larger than the stroke amount of the top of the metal contact 140).

Also, according to the rubber stem 230 according to the second modified example, which includes the elastic wall portion 231A on the upper portion of the operating portion 231, when the operating portion 231 is pressed downward and the operating portion 231 presses the pressing portion 234, the elastic wall portion 231A is also pressed to elastically deform. Thereby, it is possible to further increase the stroke amount of the operating portion 231.

Third Modified Example

Figure 12:
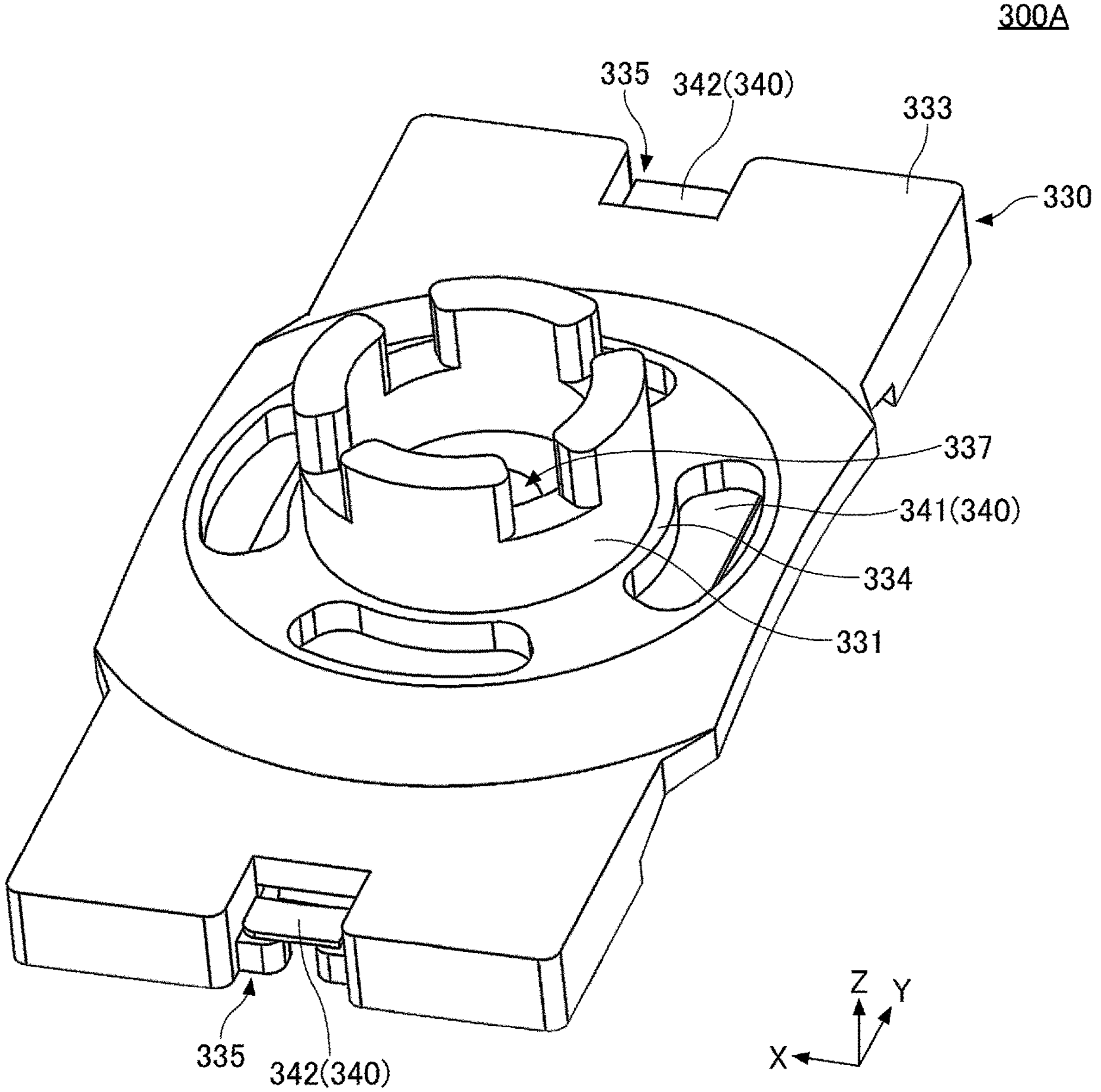
FIG. 12 is a perspective view of an outer appearance of a pressing operation body according to a third modified example.
Figure 13:
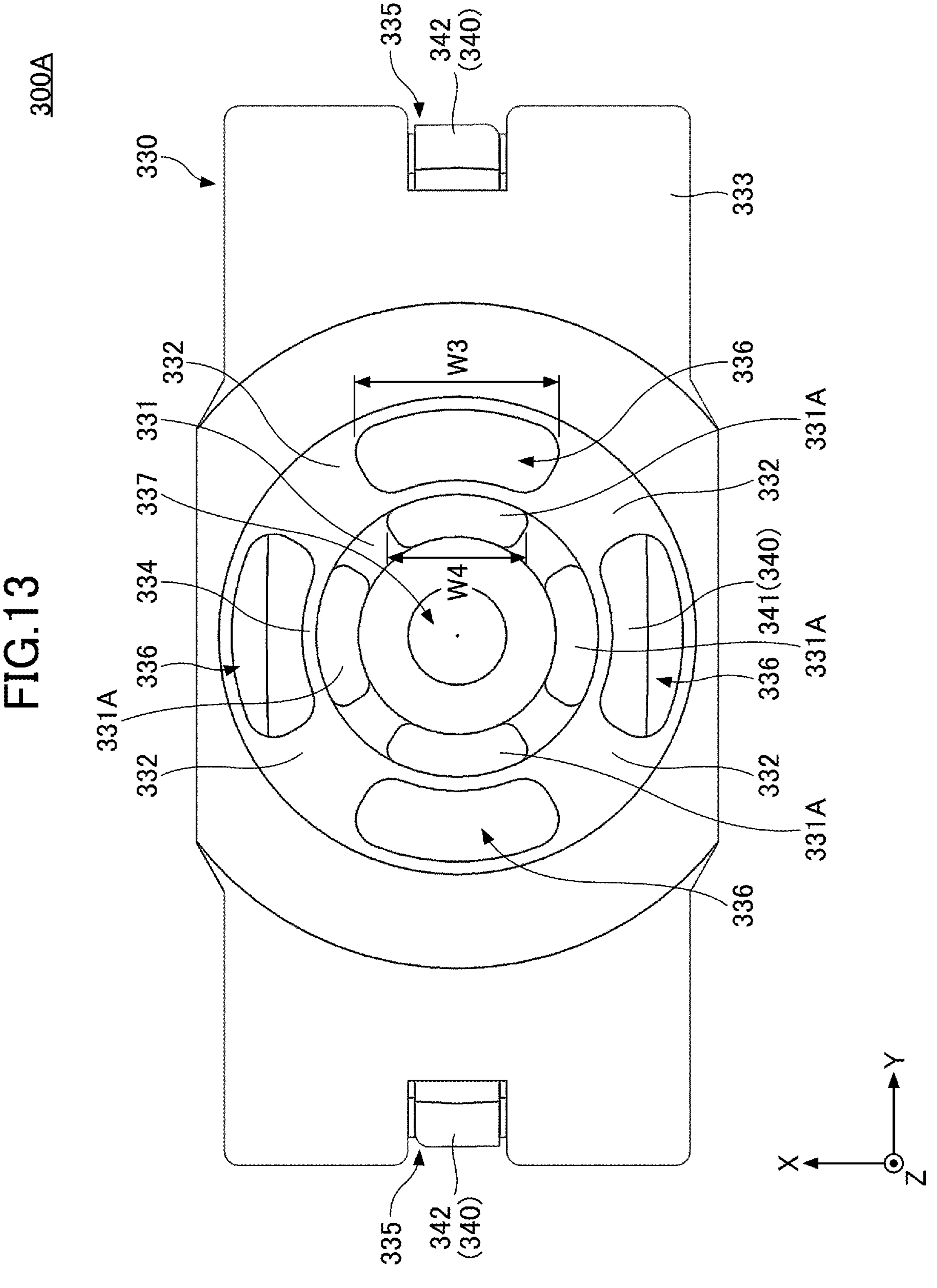
FIG. 13 is a plan view of the pressing operation body according to the third modified example.
Figure 14:
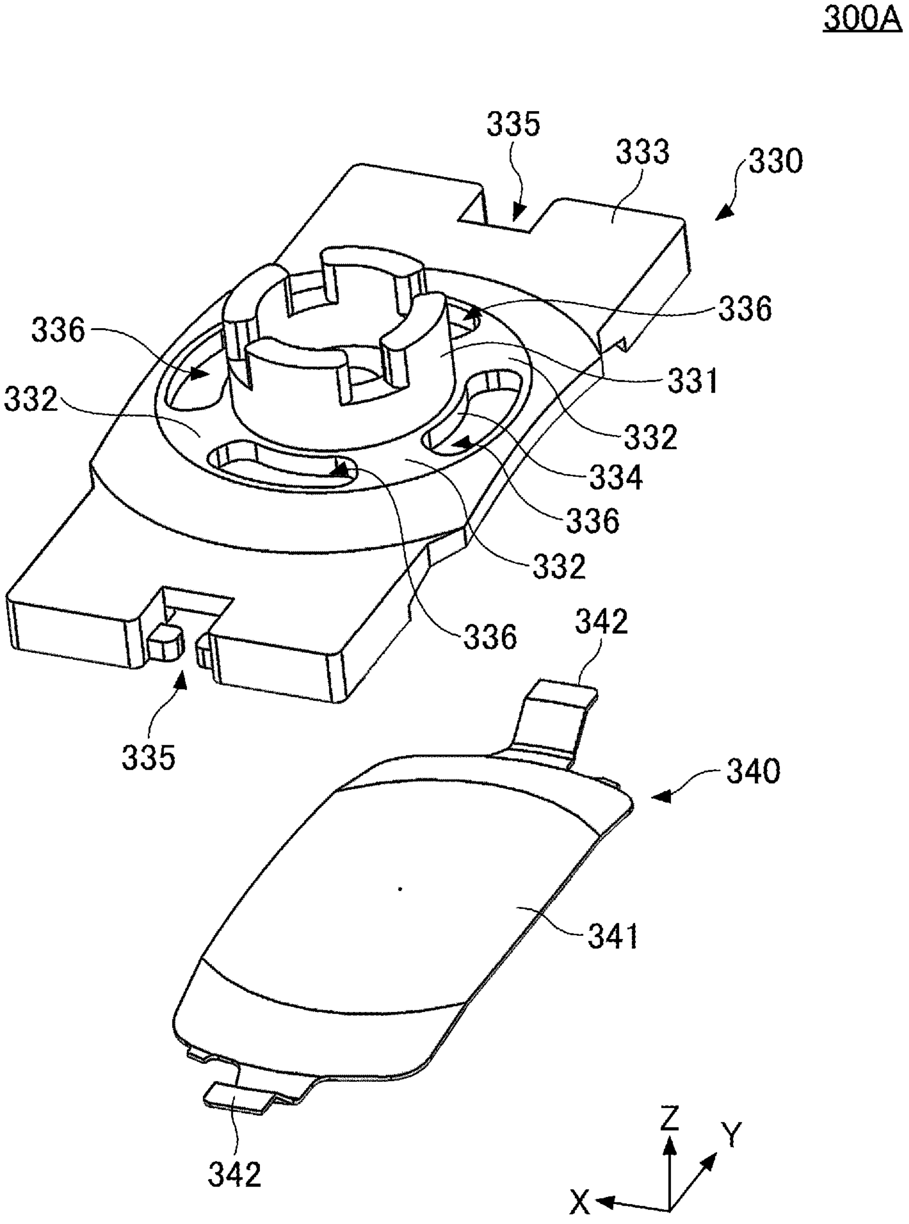
FIG. 14 is an exploded perspective view of the pressing operation body according to the third modified example.
Figure 15:
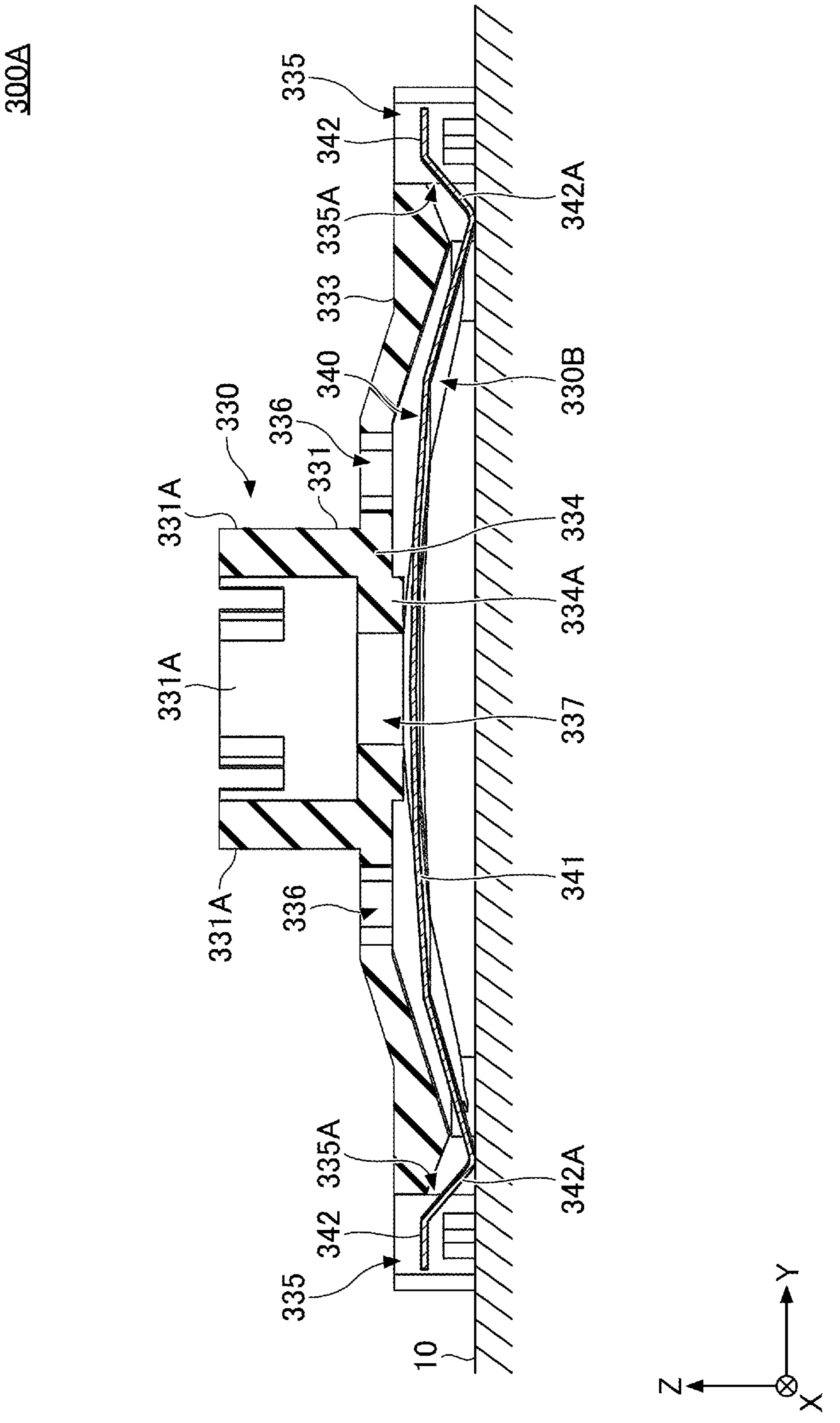
FIG. 15 is a cross-sectional view of the pressing operation body according to the third modified example.

Next, a third modified example of the switch device 100 according to one embodiment will be described with reference to FIG. 12 to FIG. 15. FIG. 12 is a perspective view of the outer appearance of a pressing operation body 300A according to the third modified example. FIG. 13 is a plan view of the pressing operation body 300A according to the third modified example. FIG. 14 is an exploded perspective view of the pressing operation body 300A according to the third modified example. FIG. 15 is a cross-sectional view of the pressing operation body 300A according to the third modified example.

As illustrated in FIG. 12 to FIG. 15, the pressing operation body 300A according to the third modified example includes a rubber stem 330 and a metal contact 340.

Similar to the switch device 100 according to one embodiment, the pressing operation body 300A according to the third modified example may be combined with the membrane switch 150 and the support plate 160. Also, similar to the switch device 100-2 according to the first modified example, the pressing operation body 300A according to the third modified example may be combined with the board 170.

The pressing operation body 300A is thin and has an oblong rectangular shape, and thus the pressing operation body 300A can be used in, for example, an oblong rectangular key of a keyboard of a laptop.

The metal contact 340 is one example of the "inversion spring". The metal contact 340 is formed of a metal plate. The metal contact 340 includes a dome portion 341 and two leg portions 342.

The dome portion 341 has, in a plan view thereof, an oblong elliptical shape (a shape formed by cutting both sides of a circular shape so as to be in the form of a straight line). Also, the dome portion 341 has a dome shape that projects upward. The dome portion 341 is disposed in a space 330B from the rear of the rubber stem 330, the space 330B being enclosed by a base portion 333 of the rubber stem 330. The dome portion 341 deforms downward into a recessed shape when the top (center) thereof is inverted in response to pressing via a pressing portion 334 of the rubber stem 330.

The two leg portions 342 are disposed at both of the left- and right-hand edges of the dome portion 341 (i.e., a pair of left- and right-hand short-side portions). The two leg portions 342 are provided to extend, from both of the left- and right-hand edges of the dome portion 341, outward in a leftward-rightward direction thereof (Y-axis direction) and upward. As illustrated in FIG. 15, each of the two leg portions 342 is inserted into a retaining portion 335 through an opening 335A of the retaining portion 335 provided on the back side of the base portion 333 of the rubber stem 330. Thereby, the two leg portions 342 are retained by the two retaining portions 335 provided in the base portion 333 of the rubber stem 330. Also, each of the two leg portions 342 includes a folded portion 342A (see FIG. 15), which is folded in a V shape, in the vicinity of the base thereof (a portion leading to the outer peripheral edge of the dome portion 341). The folded portion 342A contacts a disposition surface 10 (see FIG. 15) on which the pressing operation body 300A is disposed. Thereby, the metal contact 340 is supported by the two leg portions 342 at the disposition surface 10 on which the pressing operation body 300A is disposed.

The rubber stem 330 is a member configured to be pressed downward by an operator. The rubber stem 330 is formed of an elastic material (e.g., silicone rubber). The rubber stem 330 has a flat-plate shape and is thinner than the rubber stem 130.

The rubber stem 330 includes an operating portion 331, four beams 332, the base portion 333, the pressing portion 334, the two retaining portions 335, and four first hollowed-out portions 336.

The operating portion 331 is a portion that is provided at the center of the rubber stem 330 and configured to be pressed downward by an operator. The operating portion 331 is provided to project upward from the upper surface of the pressing portion 334, and has an approximately cylindrical shape. At the upper portion of the operating portion 331, four elastic wall portions 331A that are elastically deformable in response to pressing are disposed along the same circumference at equal intervals (i.e., 90-degree intervals). The four elastic wall portions 331A each have a thin-wall shape that is curved along the same circumference. Note that, the operating portion 331 may include three or less elastic wall portions 331A or five or more elastic wall portions 331A instead of the four elastic wall portions 331A. Alternatively, in the present modified example, the four elastic wall portions 331A are disposed in a positive X-axis direction, a negative X-axis direction, a positive Y-axis direction (which is oriented toward one of the retaining portions 335), and a negative Y-axis direction (which is oriented toward the other retaining portion 335) with a reference being the center of the operating portion 331. However, the disposition direction of each elastic wall portion 331A is not limited to this.

The pressing portion 334 is provided at the center of the rubber stem 330 and below the operating portion 331. In a plan view thereof, the pressing portion 334 has a circular shape that is slightly larger than the operating portion 331. The pressing portion 334 is provided at a position facing the top of the dome portion 341 of the metal contact 340. In response to pressing of the operating portion 331 (downward movement of the operating portion 331), the pressing portion 334 presses the top of the dome portion 341 of the metal contact 340 with a lower surface 334A (see FIG. 15) of the pressing portion 334.

Here, at the center of the pressing portion 334, a second hollowed-out portion 337 that has a circular shape in a plan view thereof is formed. The second hollowed-out portion 337 penetrates the pressing portion 334 in the upward-downward direction.

The base portion 333 is a flat-plate portion having an outer shape that is rectangular in a plan view thereof, and enclosing the pressing portion 334. The rectangular outer shape of the base portion 333 has a rightward-leftward direction (Y-axis direction) as the longitudinal direction thereof. The base portion 333 is connected to the pressing portion 334 by the four beams 332. Thereby, the base portion 333 supports, inward thereof, the four beams 332 and the pressing portion 334.

The four first hollowed-out portions 336 are each formed between the inner peripheral edge of the base portion 333 and the outer peripheral edge of the pressing portion 334. The four first hollowed-out portions 336 are circularly provided along the same circumference at equal intervals (i.e., 90-degree intervals) so as to enclose the pressing portion 334. The four first hollowed-out portions 336 each have a shape that is curved along the same circumference in a plan view thereof. Thereby, between the inner peripheral edge of the base portion 333 and the outer peripheral edge of the pressing portion 334, portions excluding the four first hollowed-out portions 336 are formed as the four beams 332. Note that, the rubber stem 330 may include three or less first hollowed-out portions 336 or five or more first hollowed-out portions 336 instead of the four first hollowed-out portions 336. Also, in the present modified example, the four first hollowed-out portions 336 are disposed in the positive X-axis direction, the negative X-axis direction, the positive Y-axis direction (which is oriented toward one of the retaining portions 335), and the negative Y-axis direction (which is oriented toward the other retaining portion 335) with a reference being the center of the operating portion 331. However, the disposition direction of each first hollowed-out portion 336 is not limited to this. Also, the first hollowed-out portion 336 does not need to completely penetrate the base portion 333, e.g., the first hollowed-out portion 336 may be closed in the form of a thin film.

Note that, as illustrated in FIG. 13, in the present modified example, the first hollowed-out portions 336 are each provided in the same radial direction as in one elastic wall portion 331A provided in the operating portion 331 and provided outward of one elastic wall portion 331A in the radial direction, with a reference being the center of the operating portion 331. In a direction orthogonal to the radial direction, a width W3 of the first hollowed-out portion 336 is equal to or larger than a width W4 of one elastic wall portion 331A.

The four beams 332 are provided at equal intervals (i.e., 90-degree intervals) between the inner peripheral edge of the base portion 333 and the outer peripheral edge of the pressing portion 334. Each of the four beams 332 has a flat-plate shape that has a certain width and extends in the form of a straight line from the outer peripheral edge of the pressing portion 334 outward in the radial direction thereof. Then, the beam 332 is connected to the inner peripheral edge of the base portion 333. The four beams 332 support the pressing portion 334 and the operating portion 331. Each of the four beams 332 elastically deforms (bends downward) in response to pressing of the operating portion 331, and moves the operating portion 331 and the pressing portion 334 downward. In this way, the beam 332 can apply an operation load to the operating portion 331. Note that, the rubber stem 330 may include three beams 332 or five or more beams 332 instead of the four beams 332.

The two retaining portions 335 are provided at both ends (i.e., a pair of short-side portions) of the base portion 333 in the rightward-leftward direction (Y-axis direction). Each of the two retaining portions 335 has a shape that is cut out toward the center of the operating portion 331 so as to have a certain width. The two leg portions 342 included in the metal contact 340 are disposed in the two retaining portions 335. Thereby, the base portion 333 retains the two leg portions 342 by the two retaining portions 335. Note that, the configuration of the retaining portion 335 of the rubber stem 330 is the same as the configuration of the retaining portion 335 of the rubber stem 130, and thus detailed description thereof will be omitted.

According to the rubber stem 330 according to the third modified example as configured in the above-described manner, in response to pressing of the operating portion 331 downward (negative Z-axis direction), the metal contact 340 is inverted, and an unillustrated switch circuit can be turned to an ON state.

Specifically, in the rubber stem 330 according to the third modified example, when the operating portion 331 is pressed downward, the pressing portion 334 moves downward together with the operating portion 331 while the beam 332 elastically deforms (bends downward). Then, the pressing portion 334 presses the top of the dome portion 341 of the metal contact 340. Once the load applied to the dome portion 341 of the metal contact 340 has exceeded a threshold, the dome portion 341 of the metal contact 340 is rapidly inverted. This inversion imparts a click sensation to the pressing of the operating portion 331, and the switch circuit is turned to an ON state.

Meanwhile, in the rubber stem 330 according to the third modified example, once the pressing of the operating portion 331 has been released, the operating portion 331 and the pressing portion 334 move upward and return to the initial state by the action of the elastic force of the beam 332. Also, the metal contact 340 returns to the original projecting shape by its own spring force. Thereby, the switch circuit is turned to an OFF state.

According to the rubber stem 330 according to the third modified example, which includes the second hollowed-out portion 337 inward of the pressing portion 334 and the first hollowed-out portion 336 outward of the pressing portion 334, when the operating portion 331 is pressed downward and the operating portion 331 presses the pressing portion 334, the pressing portion 334 can be pressed and widened in both directions of the inward direction and the outward direction. Therefore, it is possible to increase the compressive amount of the pressing portion 334. Thereby, even if a pressing load is relatively low, the rubber stem 330 according to the third modified example can obtain a relatively large stroke amount of the operating portion 331 (stroke amount that is larger than the stroke amount of the top of the metal contact 340).

Also, according to the rubber stem 330 according to the third modified example, which includes the elastic wall portion 331A on the upper portion of the operating portion 331, when the operating portion 331 is pressed downward and the operating portion 331 presses the pressing portion 334, the elastic wall portion 331A is also pressed to elastically deform. Thereby, it is possible to further increase the stroke amount of the operating portion 331.

Fourth Modified Example

Figure 16:
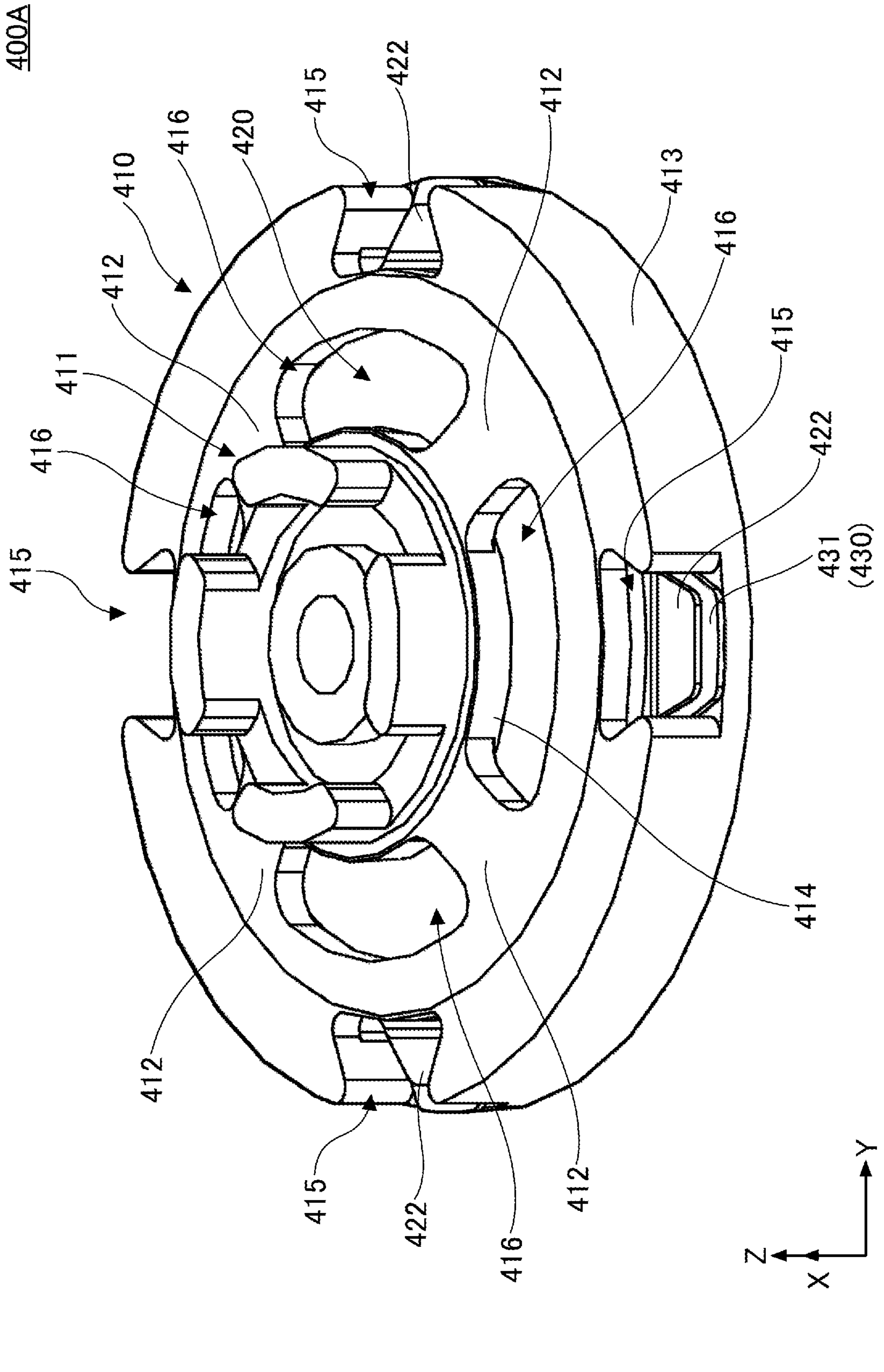
FIG. 16 is a perspective view of an outer appearance of a pressing operation body according to a fourth modified example.
Figure 17:
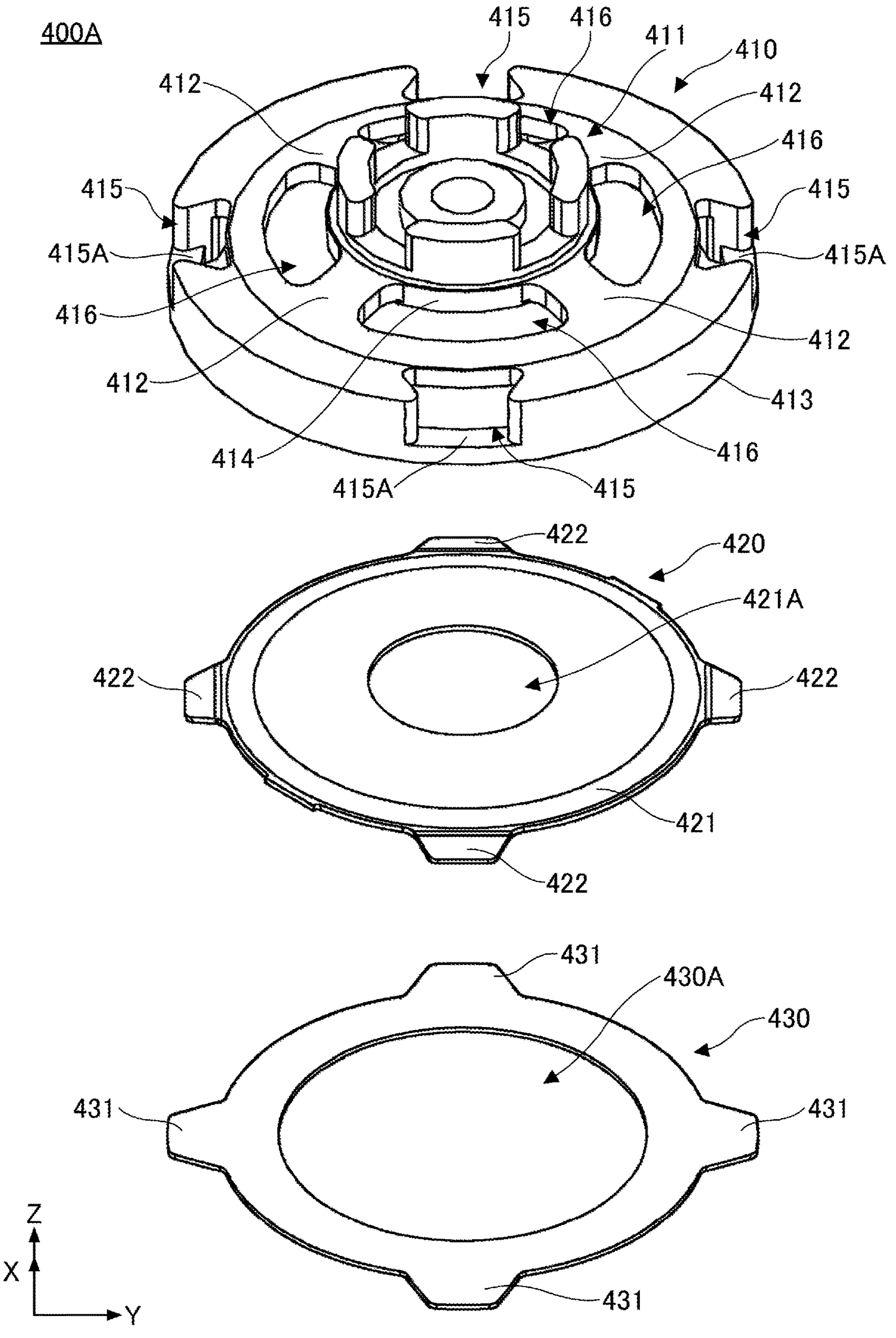
FIG. 17 is an exploded perspective view of the pressing operation body according to the fourth modified example.
Figure 18:
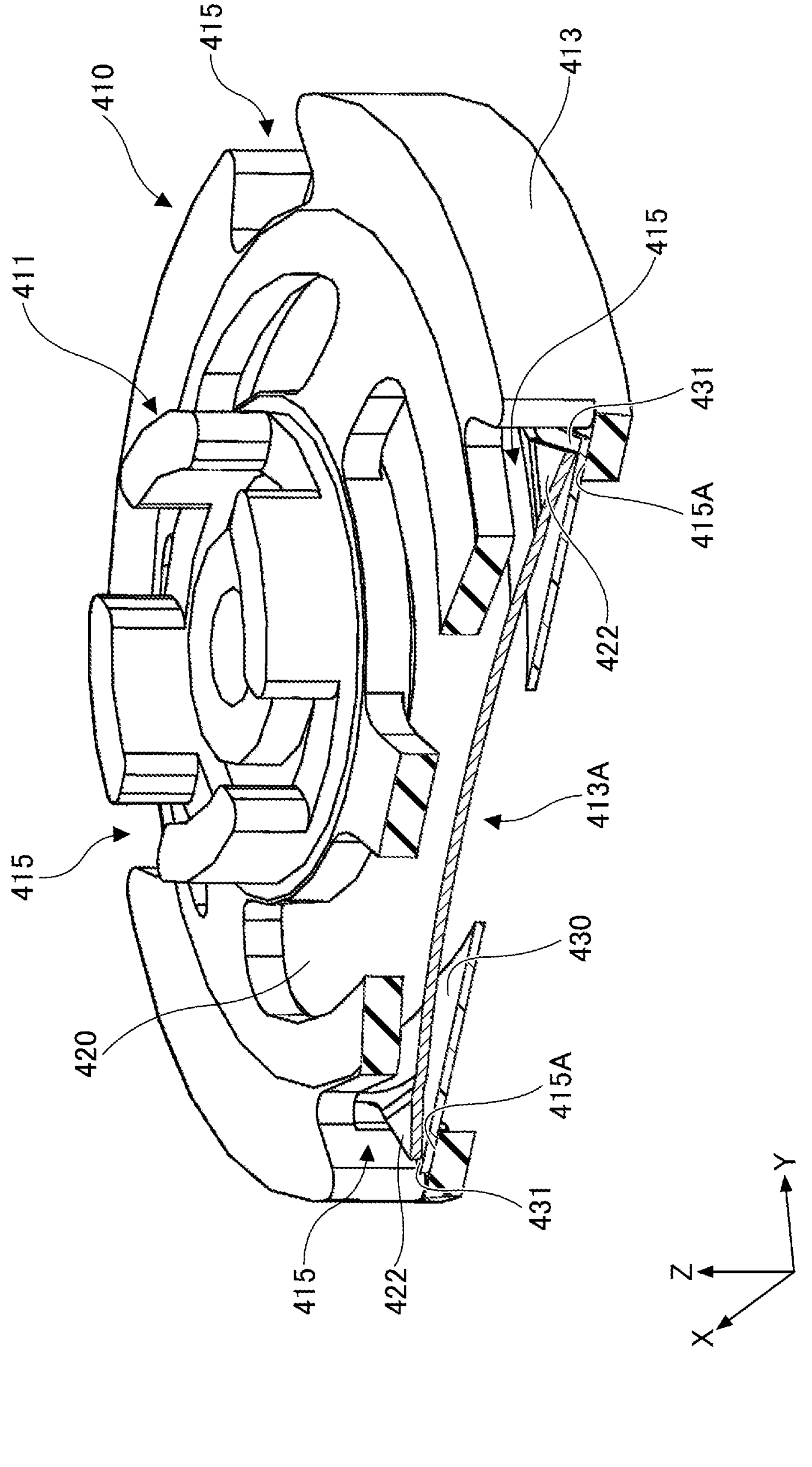
FIG. 18 is a cross-sectional view of the pressing operation body according to the fourth modified example.

Next, a fourth modified example of the switch device 100 according to one embodiment will be described with reference to FIG. 16 to FIG. 18. FIG. 16 is a perspective view of the outer appearance of a pressing operation body 400A according to the fourth modified example. FIG. 17 is an exploded perspective view of the pressing operation body 400A according to the fourth modified example. FIG. 18 is a cross-sectional view of the pressing operation body 400A according to the fourth modified example.

As illustrated in FIG. 16 to FIG. 18, the pressing operation body 400A according to the fourth modified example includes a rubber stem 410, a metal contact 420, and a protective sheet 430.

The rubber stem 410 is a member configured to be pressed downward by an operator. The rubber stem 410 is formed of an elastic material (e.g., silicone rubber). The rubber stem 410 includes an operating portion 411, four beams 412, a base portion 413, a pressing portion 414, four retaining portions 415, and four first hollowed-out portions 416. The rubber stem 410 has approximately the same configuration as in the rubber stem 230 as illustrated in FIG. 9 to FIG. 11, and thus detailed description thereof will be omitted. However, the rubber stem 410 is different from the rubber stem 230 in that the outer shape of the base portion 413 is circular in a plan view thereof from above.

The metal contact 420 is a metal plate member having a dome shape. The metal contact 420 includes a dome portion 421 in which a circular opening 421A is formed at the center thereof, and four leg portions 422 that are disposed at 90-degree intervals at the outer peripheral edge of the dome portion 421. The metal contact 420 is disposed in a space 413A enclosed by the base portion 413 of the rubber stem 410. The metal contact 420 has approximately the same configuration as in the metal contact 140. Similar to the metal contact 140, the metal contact 420 deforms downward into a recessed shape when the top (center) of the dome portion 421 is inverted in response to pressing via the pressing portion 414 of the rubber stem 410. Thereby, the metal contact 420 presses the membrane switch 150 at a rear portion of the top of the dome portion 421, and can turn the membrane switch 150 to an ON state. However, the leg portion 422 of the metal contact 420 is different from the leg portion 142 of the metal contact 140 in that the leg portion 422 thereof has a tongue-like shape.

The protective sheet 430 is a resin sheet member having a circular shape in a plan view thereof from above. The protective sheet 430 is disposed in the space 413A enclosed by the base portion 413 of the rubber stem 410, such that the protective sheet 430 covers the lower surface of the metal contact 420 (see FIG. 18). Thereby, the protective sheet 430 protects the rear surface of the metal contact 420. The outer diameter of the protective sheet 430 is approximately the same as the outer diameter of the metal contact 420. The protective sheet 430 includes four projecting portions 431 that are disposed at the outer peripheral edge at 90-degree intervals. The four projecting portions 431 each have a tongue-like shape that projects outward in the radial direction from the outer peripheral edge of the protective sheet 430. The four projecting portions 431 protect the rear surfaces of the four leg portions 422 of the metal contact 420. At the center of the protective sheet 430 (i.e., a position at which the protective sheet 430 overlaps the top of the metal contact 140), a circular opening 430A is formed. Thereby, according to the pressing operation body 400A according to the fourth modified example, the rear portion of the top of the metal contact 420 presses the membrane switch 150 in the opening 430A of the protective sheet 430, and the membrane switch 150 can be turned to an ON state.

As illustrated FIG. 18, in the pressing operation body 400A according to the fourth modified example, each of the four leg portions 422 of the metal contact 420 is inserted from the space 413A of the rubber stem 410 into the retaining portion 415 of the rubber stem 410, and is placed on a placement surface 415A included in the retaining portion 415. Thereby, the four leg portions 422 of the metal contact 420 are retained by the four retaining portions 415 of the rubber stem 410.

Here, as illustrated in FIG. 18, in a state where each of the four leg portions 422 of the metal contact 420 is stacked on the upper surface of the projecting portion 431 of the protective sheet 430, the leg portion 422 is inserted into the retaining portion 415 of the rubber stem 410 together with the projecting portion 431 of the protective sheet 430, and is placed on the placement surface 415A included in the retaining portion 415.

Thereby, in the pressing operation body 400A according to the fourth modified example, the bottom of the leg portion 422 of the metal contact 420 can be protected by the projecting portion 431 of the protective sheet 430 in the retaining portion 415 of the rubber stem 410. Therefore, according to the pressing operation body 400A according to the fourth modified example, it is possible to suppress an adhesive overflowing in the space 413A enclosed by the base portion 413 upon adhering the bottom portion of the base portion 413 of the rubber stem 410 with the adhesive, from entering the retaining portion 415 of the rubber stem 410 and adhering to the leg portion 422 of the metal contact 420. Therefore, according to the pressing operation body 400A according to the fourth modified example, it is possible for the inversion of the metal contact 420 not to be affected by the adhesive.

Fifth Modified Example

Figure 19:
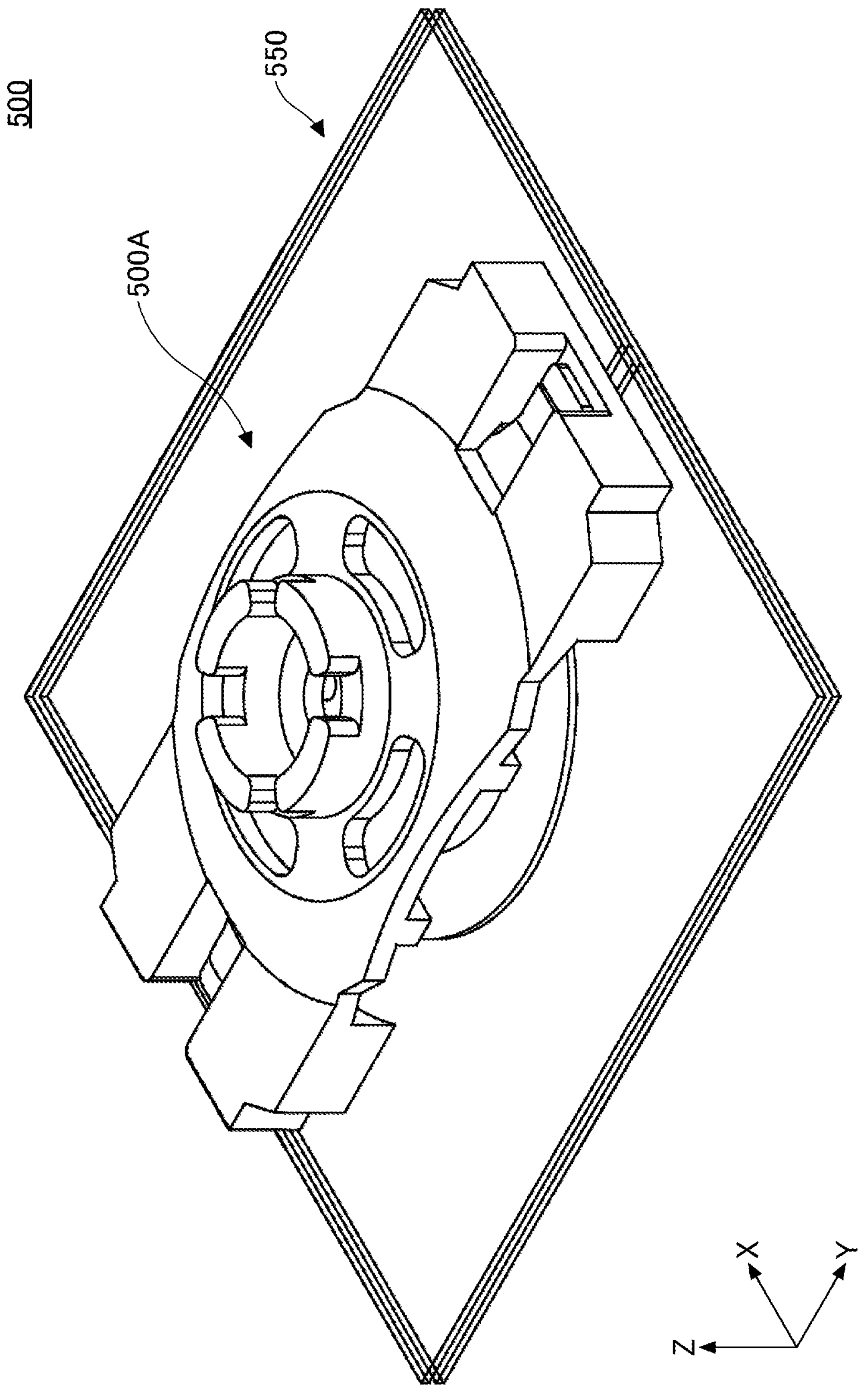
FIG. 19 is a perspective view of an outer appearance of a switch device according to a fifth modified example.
Figure 20:
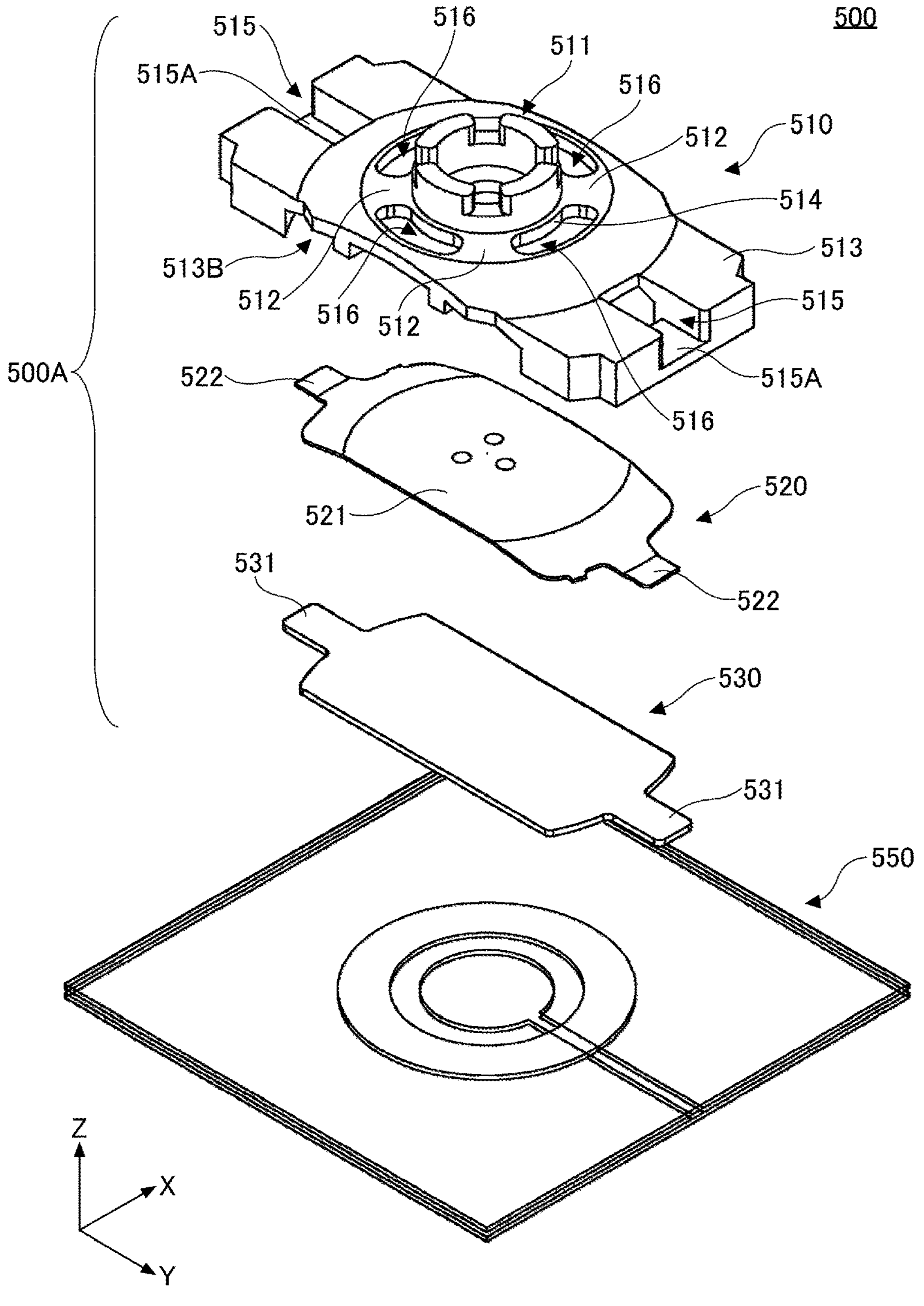
FIG. 20 is an exploded perspective view of the switch device according to the fifth modified example.
Figure 21:
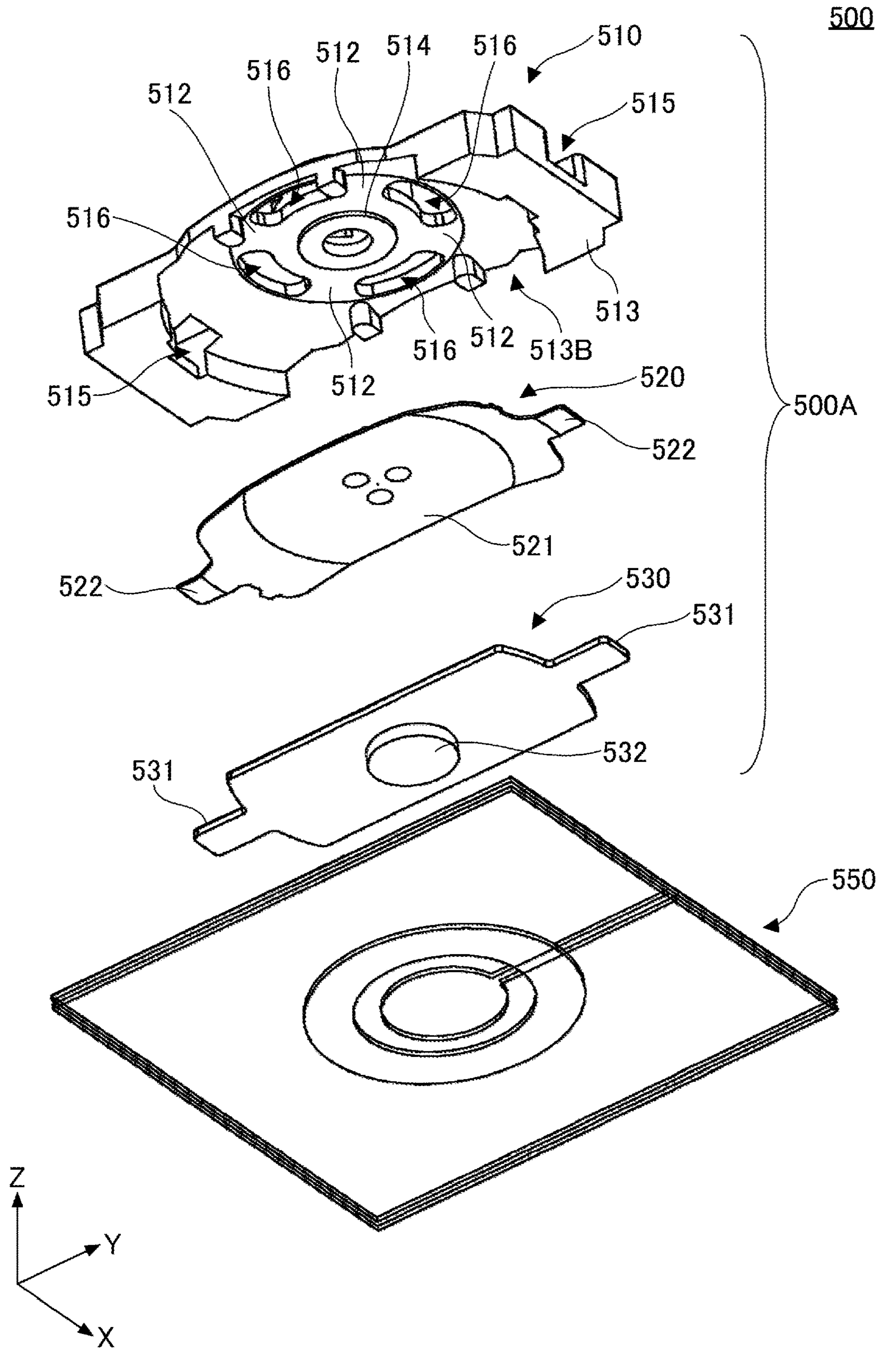
FIG. 21 is an exploded perspective view of the switch device according to the fifth modified example.
Figure 22:
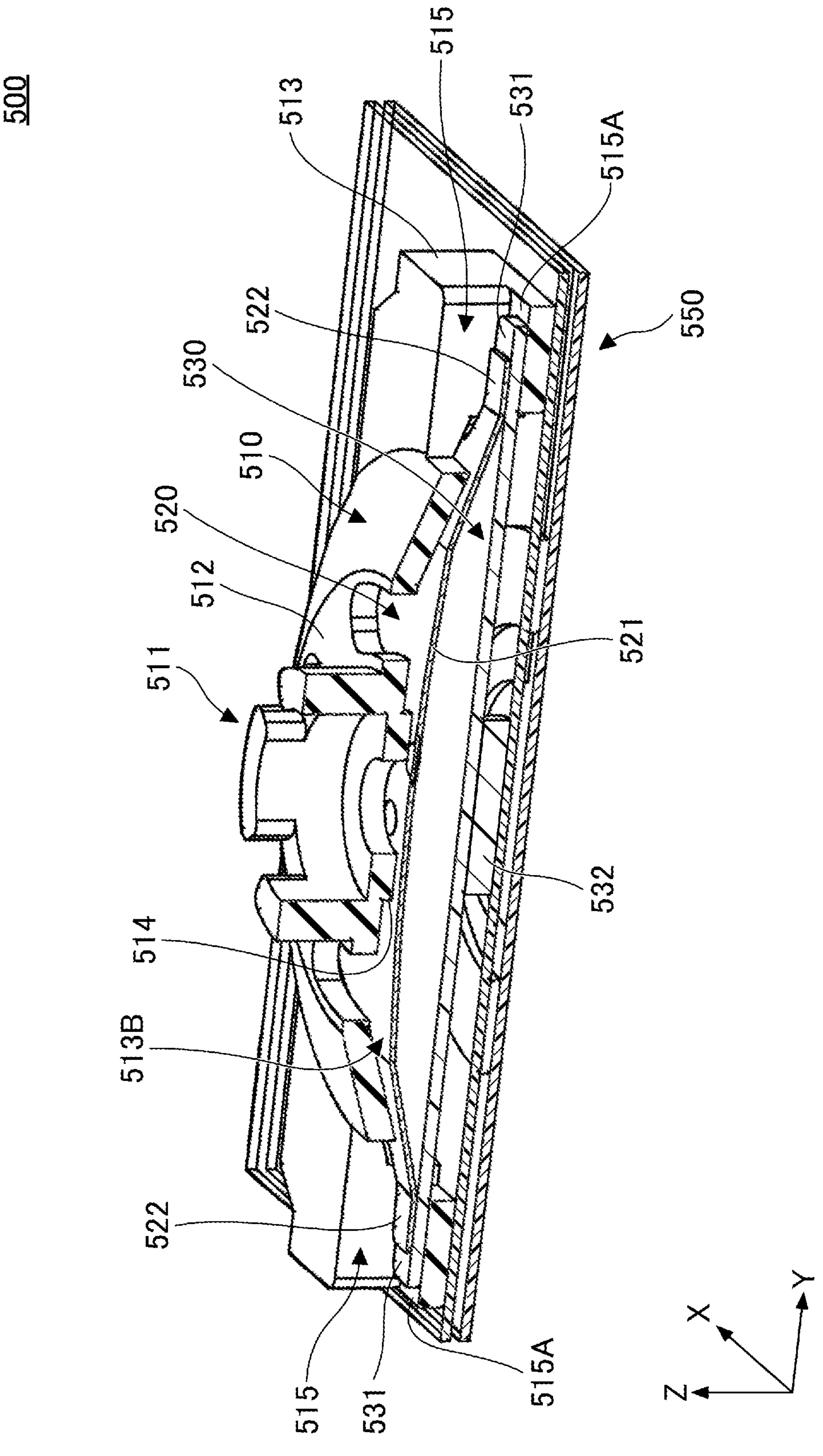
FIG. 22 is a cross-sectional view of the switch device according to the fifth modified example.

Next, a fifth modified example of the switch device 100 according to one embodiment will be described with reference to FIG. 19 to FIG. 22. FIG. 19 is a perspective view of the outer appearance of the switch device 500 according to the fifth modified example. FIG. 20 and FIG. 21 are each an exploded perspective view of the switch device 500 according to the fifth modified example. FIG. 22 is a cross-sectional view of the switch device 500 according to the fifth modified example.

As illustrated in FIG. 19 to FIG. 22, the switch device 500 according to the fifth modified example includes a pressing operation body 500A and a membrane switch 550. In the switch device 500, the pressing operation body 500A is disposed on the upper surface of the membrane switch 550.

Similar to the pressing operation body 300A as illustrated in FIG. 12 to FIG. 15, the pressing operation body 500A is thin and has an oblong rectangular shape. Thus, the pressing operation body 500A can be used in, for example, an oblong rectangular key of a keyboard of a laptop. The pressing operation body 500A includes a rubber stem 510, a metal contact 520, and a protective sheet 530.

The rubber stem 510 is a member configured to be pressed downward by an operator. The rubber stem 510 is formed of an elastic material (e.g., silicone rubber). The rubber stem 510 includes an operating portion 511, four beams 512, a base portion 513, a pressing portion 514, two retaining portions 515, and four first hollowed-out portions 516. The rubber stem 510 has approximately the same configuration as in the rubber stem 330 as illustrated in FIG. 12 to FIG. 15, and thus detailed description thereof will be omitted.

The metal contact 520 is a metal plate member having a dome shape. The metal contact 520 includes a dome portion 521, and two leg portions 522 that are provided at a pair of short-side portions of the outer peripheral edge of the dome portion 521. The metal contact 520 is disposed in a space 513B from the rear of the rubber stem 510, the space 513B being enclosed by the base portion 513 of the rubber stem 510. The metal contact 520 has approximately the same configuration as in the metal contact 340 as illustrated in FIG. 12 to FIG. 15.

Similar to the metal contact 340 as illustrated in FIG. 12 to FIG. 15, the metal contact 520 deforms downward into a recessed shape when the top (center) of the dome portion 521 is inverted in response to pressing via the pressing portion 514 of the rubber stem 510. Thereby, the metal contact 520 presses a projection 532 at a rear portion of the top of the dome portion 521, the projection 532 being provided at the rear surface of the protective sheet 530. In this way, by pressing the membrane switch 550 via the projection 532, it is possible to turn the membrane switch 550 to an ON state.

The protective sheet 530 is a resin sheet member having an oblong rectangular shape in a plan view thereof from above. The protective sheet 530 is disposed in the space 513B enclosed by the base portion 513 of the rubber stem 510, such that the protective sheet 530 covers the lower surface of the metal contact 520 (see FIG. 22). Thereby, the protective sheet 530 protects the rear surface of the metal contact 520. The protective sheet 530 includes two projecting portions 531 that are disposed at a pair of short-side portions so as to face each other. The two projecting portions 531 each have a tongue-like shape that projects outward from the short-side portions of the protective sheet 530. The two projecting portions 531 protect the rear surfaces of the two leg portions 522 of the metal contact 520.

As illustrated in FIG. 22, in the pressing operation body 500A according to the fifth modified example, each of the two leg portions 522 of the metal contact 520 is inserted from the space 513B of the rubber stem 510 into the retaining portion 515 of the rubber stem 510, and is placed on a placement surface 515A included in the retaining portion 515. Thereby, the two leg portions 522 of the metal contact 520 are retained by the two retaining portions 515 of the rubber stem 510.

Here, as illustrated in FIG. 22, in a state where each of the two leg portions 522 of the metal contact 520 is stacked on the upper surface of the projecting portion 531 of the protective sheet 530, the leg portion 522 is inserted into the retaining portion 515 of the rubber stem 510 together with the projecting portion 531 of the protective sheet 530, and is placed on the placement surface 515A included in the retaining portion 515.

Thereby, in the pressing operation body 500A according to the fifth modified example, the bottom of the leg portion 522 of the metal contact 520 can be protected by the projecting portion 531 of the protective sheet 530 in the retaining portion 515 of the rubber stem 510. Therefore, according to the pressing operation body 500A according to the fifth modified example, it is possible to suppress an adhesive overflowing in the space 513B enclosed by the base portion 513 upon adhering the bottom portion of the base portion 513 of the rubber stem 510 with the adhesive, from entering the retaining portion 515 of the rubber stem 510 and adhering to the leg portion 522 of the metal contact 520. Therefore, according to the pressing operation body 500A according to the fifth modified example, it is possible for the inversion of the metal contact 520 not to be affected by the adhesive.

Also, in the pressing operation body 500A according to the fifth modified example, the resin columnar projection 532 is adhesively provided at the center of the rear surface of the protective sheet 530 (i.e., a position that overlaps the top of the metal contact 520).

Thereby, according to the pressing operation body 500A according to the fifth modified example, when the metal contact 520 is inverted, the metal contact 520 presses the projection 532 at a rear portion of the top of the dome portion 521 of the metal contact 520, the projection 532 being provided at the rear surface of the protective sheet 530. In this way, by pressing the membrane switch 550 via the projection 532, it is possible to turn the membrane switch 550 to an ON state.

In this way, the pressing operation body 500A according to the fifth modified example presses the membrane switch 550 via the projection 532, and thereby can locally and reliably press the center of the membrane switch 550 via the projection 532 and can increase the pressing load to press the membrane switch 550.

Sixth Modified Example

Figure 23:
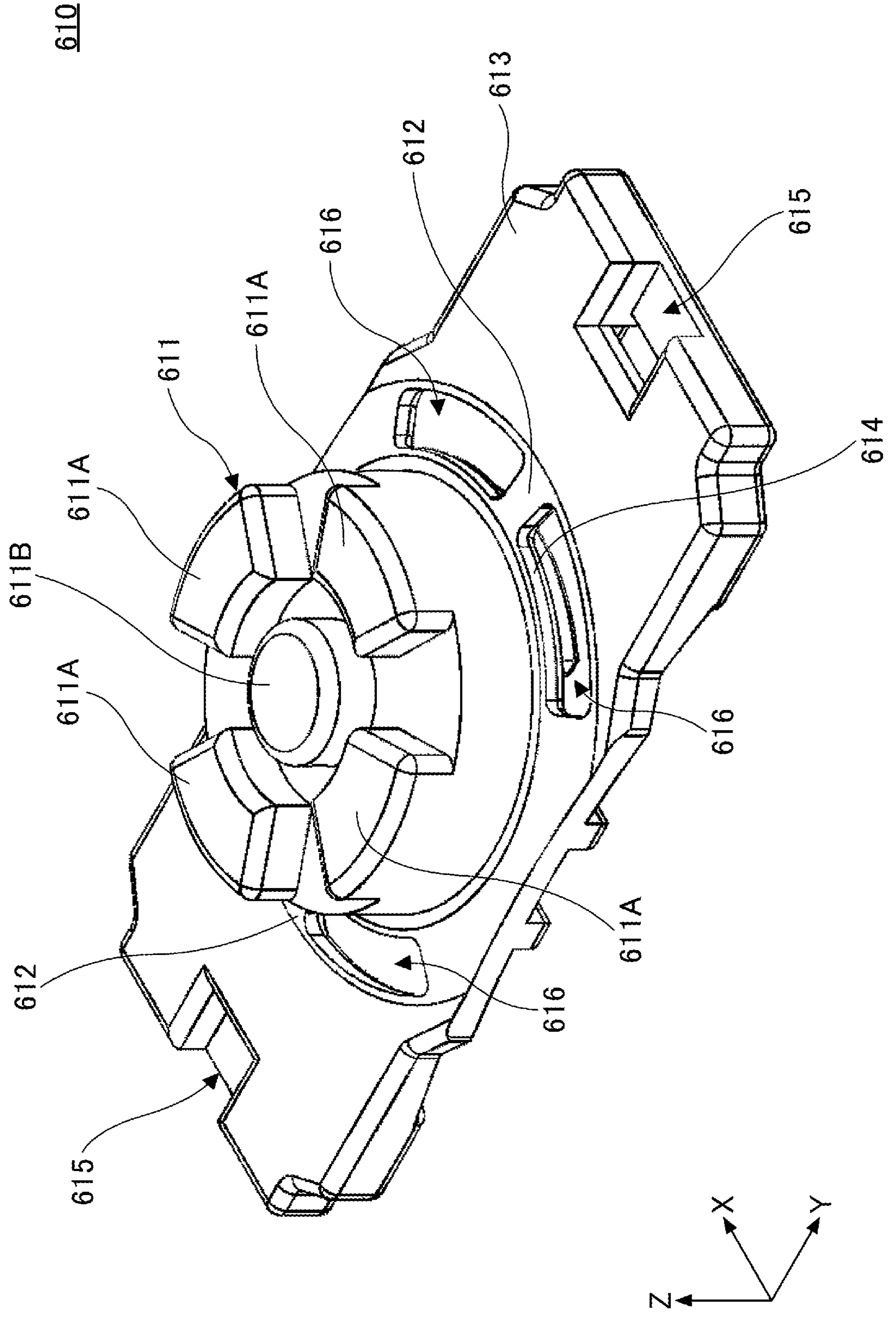
FIG. 23 is a perspective view of an outer appearance of a rubber stem according to a sixth modified example.
Figure 24:
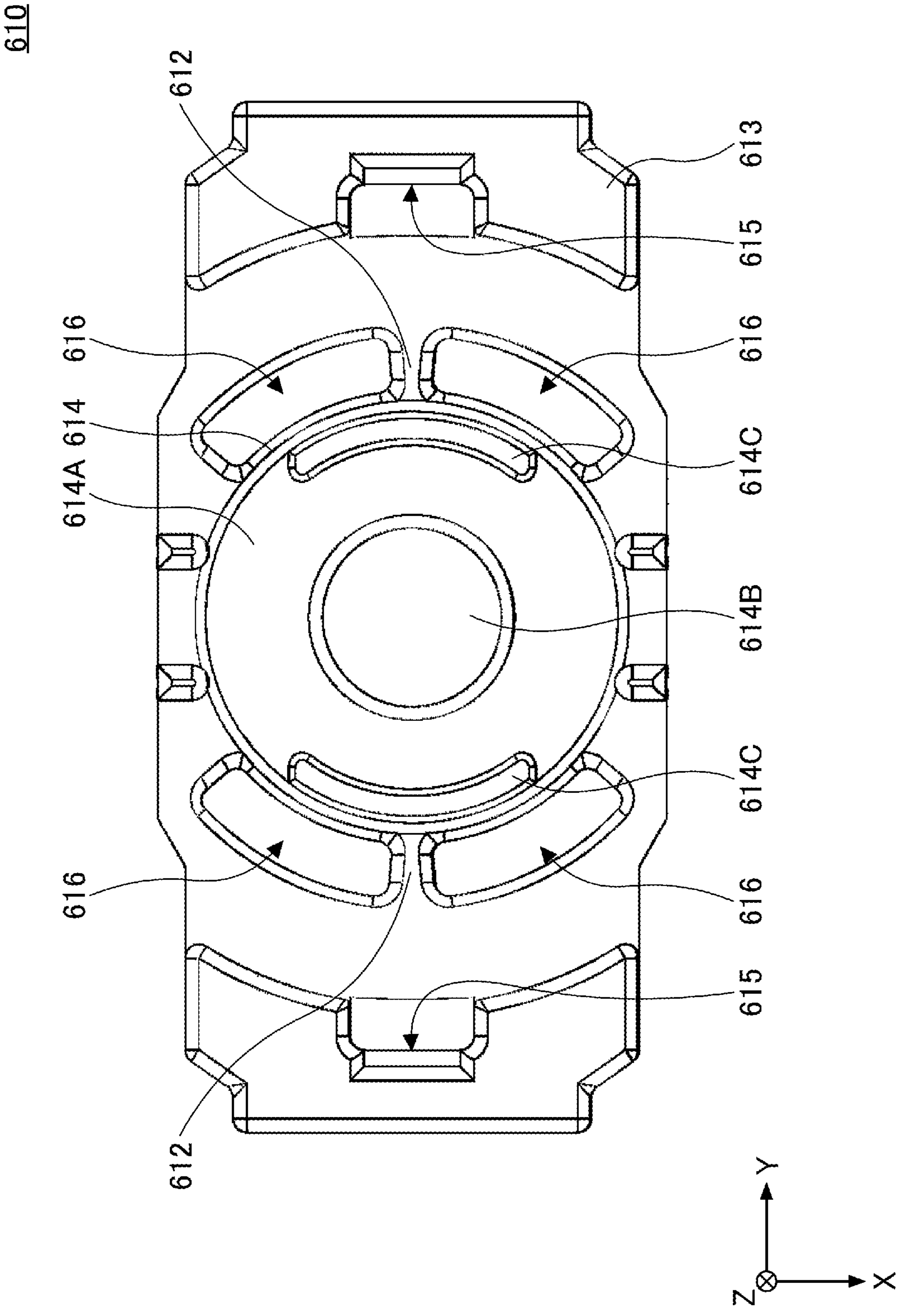
FIG. 24 is a bottom view illustrating a first example of a configuration of a bottom of the rubber stem according to the sixth modified example.
Figure 25:
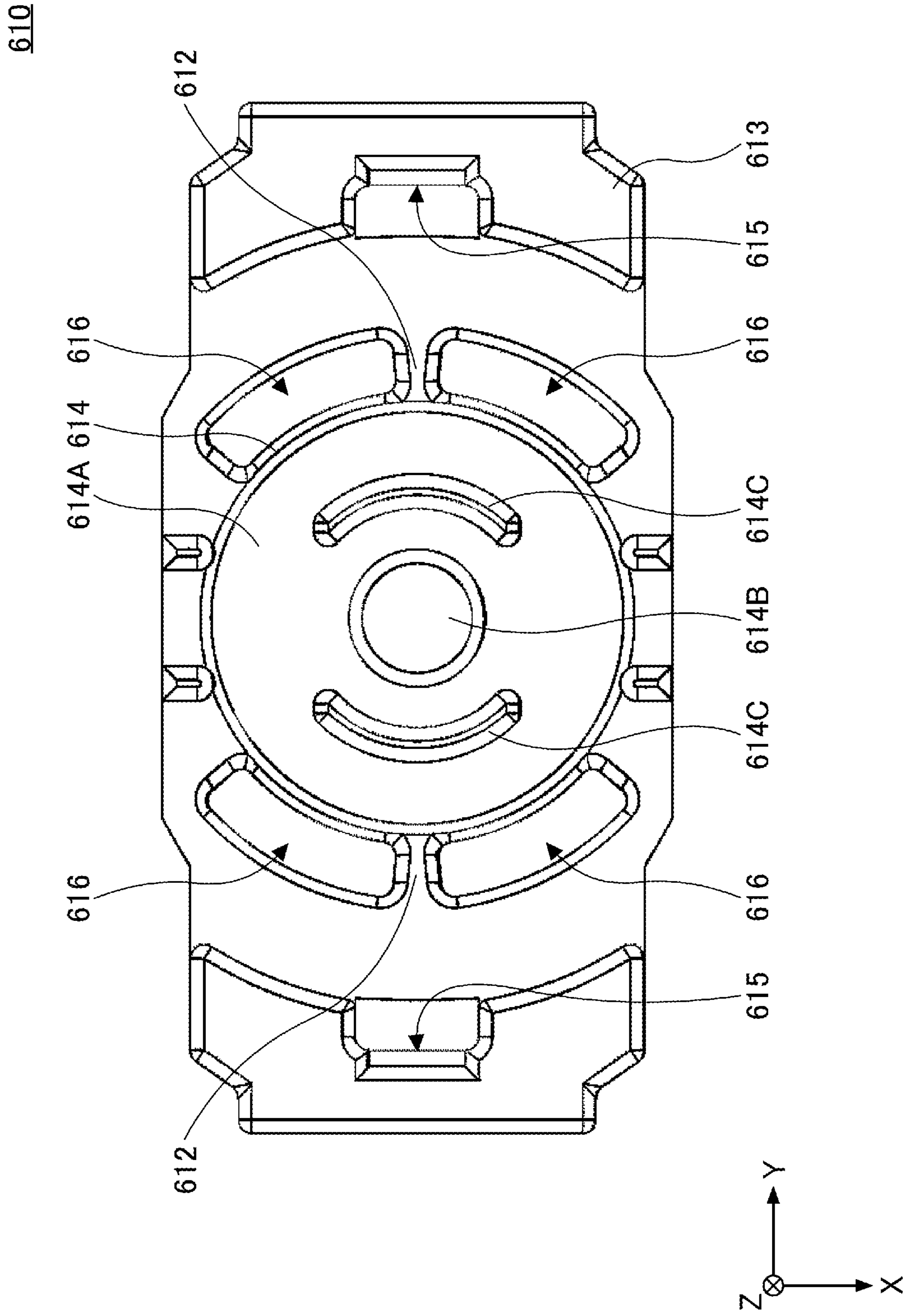
FIG. 25 is a bottom view illustrating a second example of the configuration of the bottom of the rubber stem according to the sixth modified example.
Figure 26:
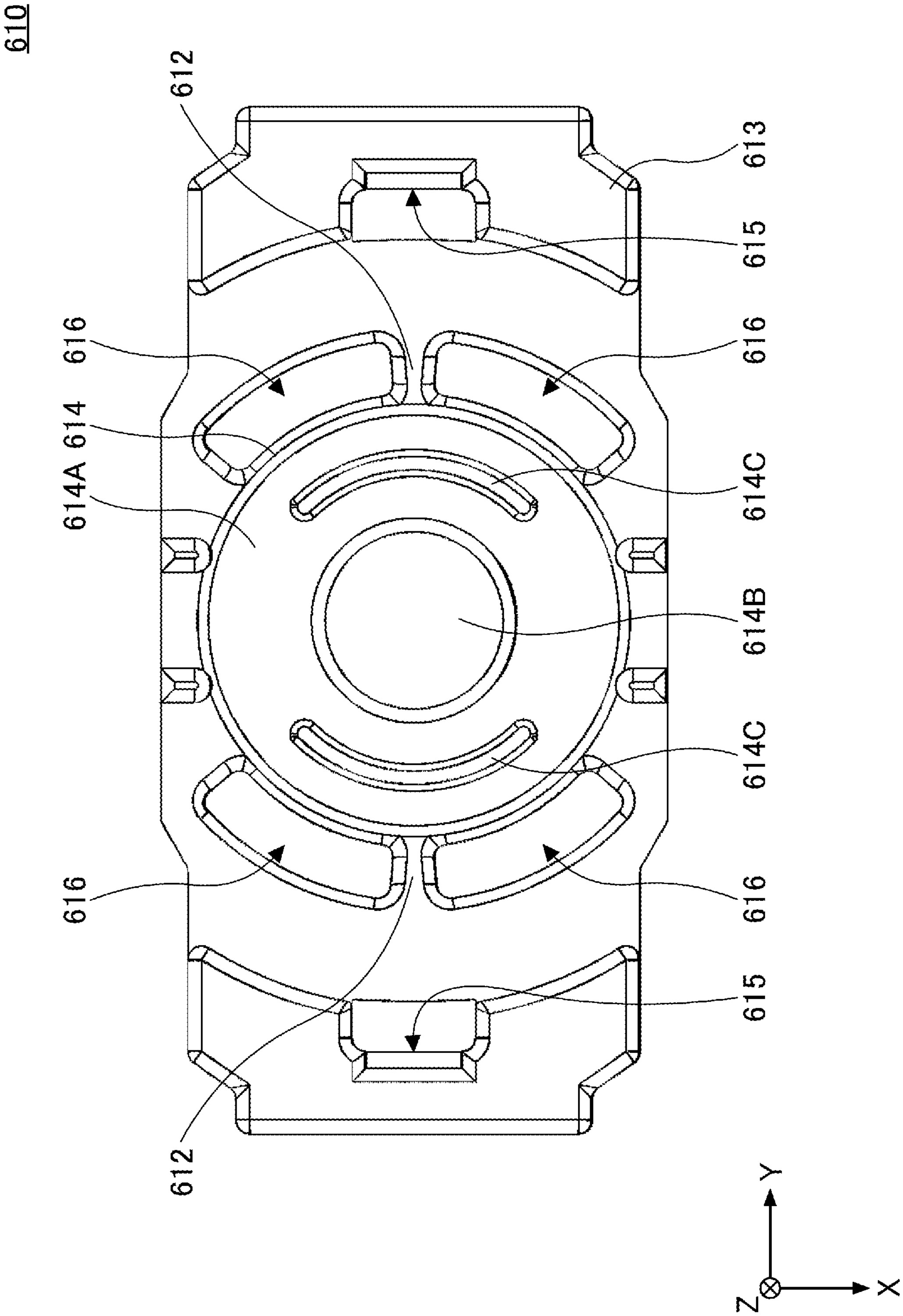
FIG. 26 is a bottom view illustrating a third example of the configuration of the bottom of the rubber stem according to the sixth modified example.

Next, a sixth modified example of the switch device 100 according to one embodiment will be described with reference to FIG. 23 to FIG. 30. FIG. 23 is a perspective view of the outer appearance of a rubber stem 610 according to the sixth modified example. FIG. 24 is a bottom view illustrating a first example of the configuration of the bottom of the rubber stem 610 according to the sixth modified example. FIG. 25 is a bottom view illustrating a second example of the configuration of the bottom of the rubber stem 610 according to the sixth modified example. FIG. 26 is a bottom view illustrating a third example of the configuration of the bottom of the bottom of the rubber stem 610 according to the sixth modified example.

As illustrated in FIG. 23, similar to the rubber stem 330 as illustrated in FIG. 12 to FIG. 15, the rubber stem 610 according to the sixth modified example is thin and has an oblong rectangular shape, and thus the rubber stem 610 can be used in, for example, an oblong rectangular key of a keyboard of a laptop.

The rubber stem 610 is a member configured to be pressed downward by an operator. The rubber stem 610 is formed of an elastic material (e.g., silicone rubber). The rubber stem 610 includes an operating portion 611, two beams 612, a base portion 613, a pressing portion 614, two retaining portions 615, and four first hollowed-out portions 616.

The rubber stem 610 has approximately the same configuration as in the rubber stem 330 as illustrated in FIG. 12 to FIG. 15. However, the rubber stem 610 is different from the rubber stem 330 as illustrated in FIG. 12 to FIG. 15 in terms of the below-described points.

First, in the rubber stem 610, the operating portion 611 has an approximately cylindrical shape. At the upper portion of the operating portion 611, four elastic wall portions 611A that are elastically deformable in response to pressing are disposed along the same circumference at equal intervals (i.e., 90-degree intervals). The four elastic wall portions 611A each have a thick-wall shape that is curved along the same circumference. Also, at the center of the upper portion of the operating portion 611, a columnar center projection 611B is provided.

Also, the rubber stem 610 includes the two beams 612 extending from the operating portion 611 in the longitudinal direction thereof (positive Y-axis direction and negative Y-axis direction). Each of the beams 612 is formed between the two first hollowed-out portions 616 so as to be in the longitudinal direction (positive Y-axis side and negative Y-axis side) from the operating portion 611.

Also, as illustrated in FIG. 24 to FIG. 26, in the rubber stem 610, a bottom 614A of the pressing portion 614 is provided with a first projecting pressing portion 614B and two second projecting pressing portions 614C.

The first projecting pressing portion 614B is provided to project downward and at the center in the bottom 614A of the pressing portion 614. The first projecting pressing portion 614B has a cylindrical shape. The first projecting pressing portion 614B presses the center of the top of a metal contact 620.

The two second projecting pressing portions 614C are provided to project downward and at a peripheral portion of the bottom 614A of the pressing portion 614. The two second projecting pressing portions 614C are symmetrically provided to sandwich the first projecting pressing portion 614B in the longitudinal direction of the rubber stem 610 (Y-axis direction). The second projecting pressing portion 614C has a thin-wall shape that is concentrically curved along the circular shape of the bottom 614A of the pressing portion 614. The second projecting pressing portion 614C presses the outer peripheral portion of the top of the metal contact 620.

Movement of Pressing Operation Body 600A

Figure 27:
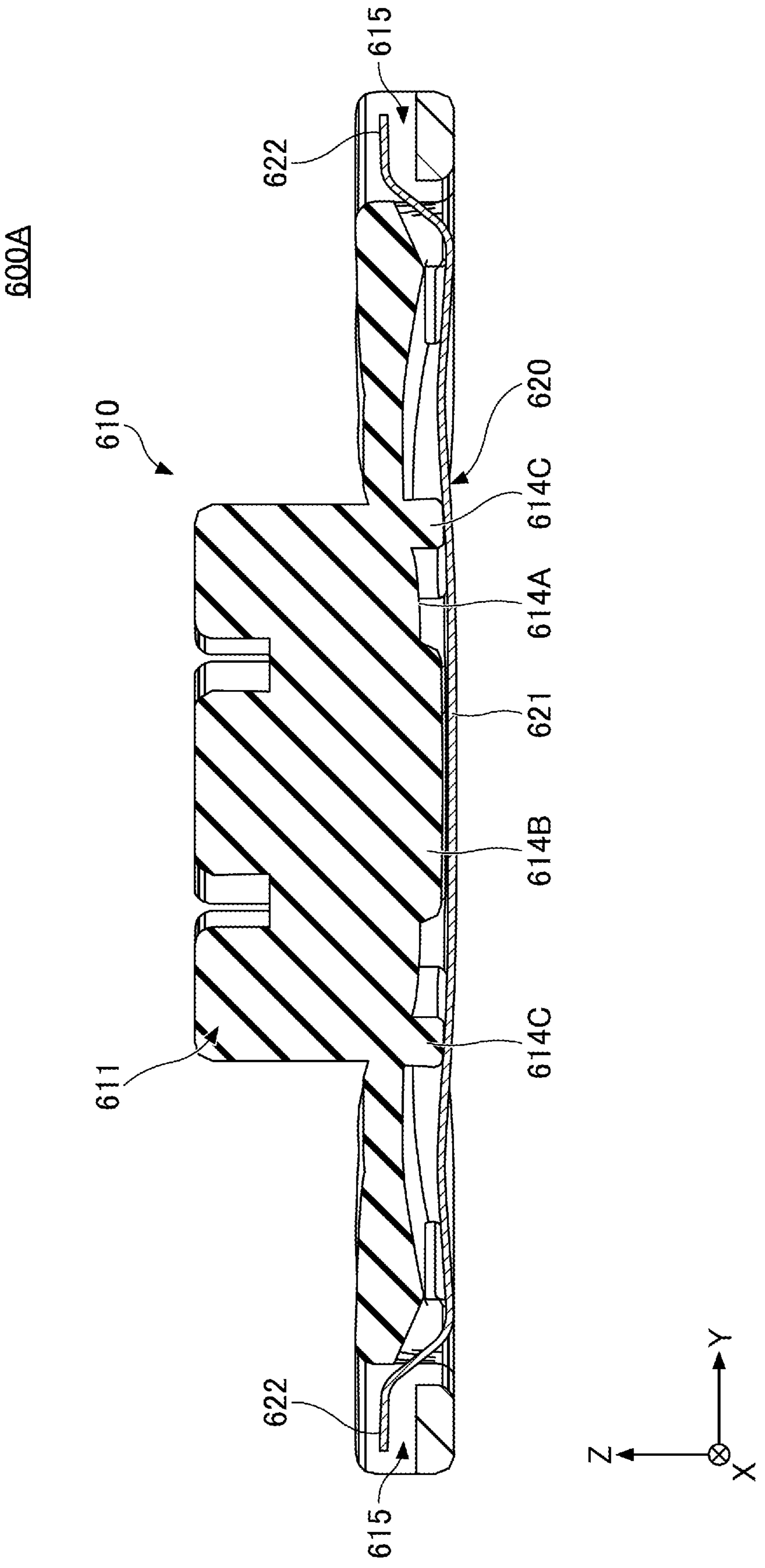
FIG. 27 is a cross-sectional view of a pressing operation body according to the sixth modified example upon being moved.

FIG. 27 is a cross-sectional view of the pressing operation body 600A according to the sixth modified example upon being moved. The pressing operation body 600A as illustrated in FIG. 27 includes the rubber stem 610 and the metal contact 620 as illustrated in FIG. 23 to FIG. 26.

Similar to the metal contact 340 as illustrated in FIG. 12 to FIG. 15, the metal contact 620 has, in a plan view thereof, an oblong elliptical shape (a shape formed by cutting both sides of a circular shape so as to be in the form of a straight line). Also, the metal contact 620 has a dome shape that projects upward. In the metal contact 620, two leg portions 622 are retained by two retaining portions 615 of the rubber stem 610.

According to the pressing operation body 600A according to the sixth modified example, when the rubber stem 610 is pressed, the outer peripheral portion of the top of the dome portion 621 of the metal contact 620 is pressed by the two second projecting pressing portions 614C included in the rubber stem 610. Thereby, once the amount of movement of the pressed rubber stem 610 has reached a predetermined amount, it is possible to invert the inner portion compared to the outer portion of the top of the dome portion 621 of the metal contact 620. At this time, the pressing operation body 600A can impart a click sensation to an operator because the operation load by the pressing rapidly decreases. The pressing operation body 600A does not turn an unillustrated membrane switch to an ON state at the time the top of the dome portion 621 of the metal contact 620 has been inverted.

The pressing operation body 600A according to the sixth modified example can turn the membrane switch to an ON state in the following manner. Specifically, when the top of the dome portion 621 of the metal contact 620 has been inverted and further the amount of movement of the pressed rubber stem 610 has increased, the two second projecting pressing portions 614C are compressed. Then, the inverted top of the dome portion 621 of the metal contact 620 is further pressed by the two second projecting pressing portions 614C and the first projecting pressing portion 614B.

At this time, in the pressing operation body 600A according to the sixth modified example, when the two second projecting pressing portions 614C have been compressed, the amount of projection of the two second projecting pressing portions 614C is larger than the amount of projection of the first projecting pressing portion 614B (see FIG. 27) so that the first projecting pressing portion 614B can press the top of the dome portion 621 of the metal contact 620.

In this way, according to the pressing operation body 600A according to the sixth modified example, which includes the two second projecting pressing portions 614C at the rubber stem 610, it is possible to increase the amount of movement achieved by pressing even after the top of the dome portion 621 of the metal contact 620 has been inverted, i.e., it is possible to realize what is called an over stroke operation.

Note in FIG. 24 to FIG. 26 that, as variations, the positions of the second projecting pressing portions 614C (the distances apart from the first projecting pressing portion 614B) and the circumferential lengths of the second projecting pressing portions 614C are made different.

One Example of Load Characteristics Obtained By Pressing

Figure 28:
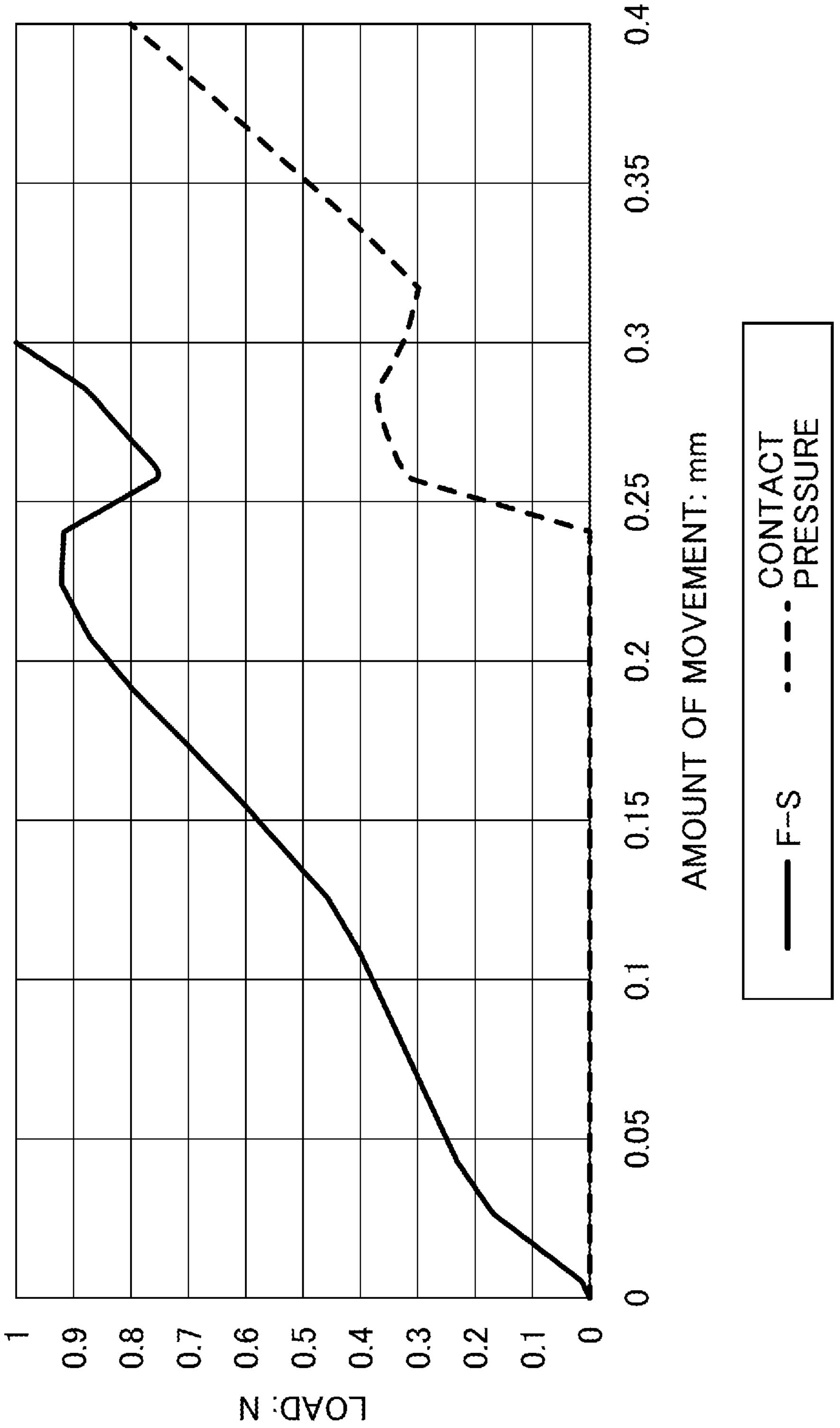
FIG. 28 is a view illustrating one example of load characteristics obtained by pressing the pressing operation body according to the sixth modified example.
Figure 29:
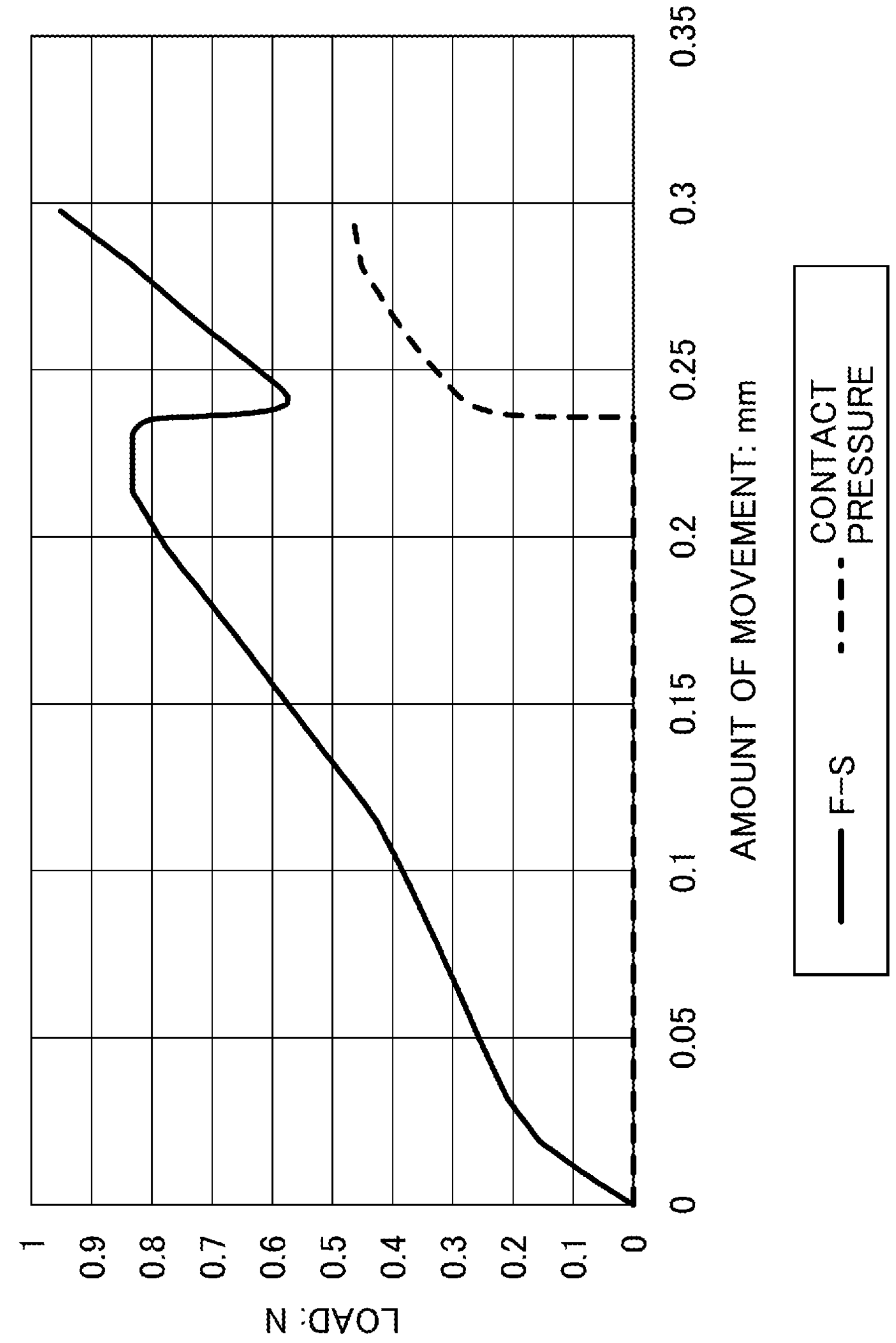
FIG. 29 is a view illustrating one example of load characteristics obtained by pressing the pressing operation body according to the sixth modified example.
Figure 30:
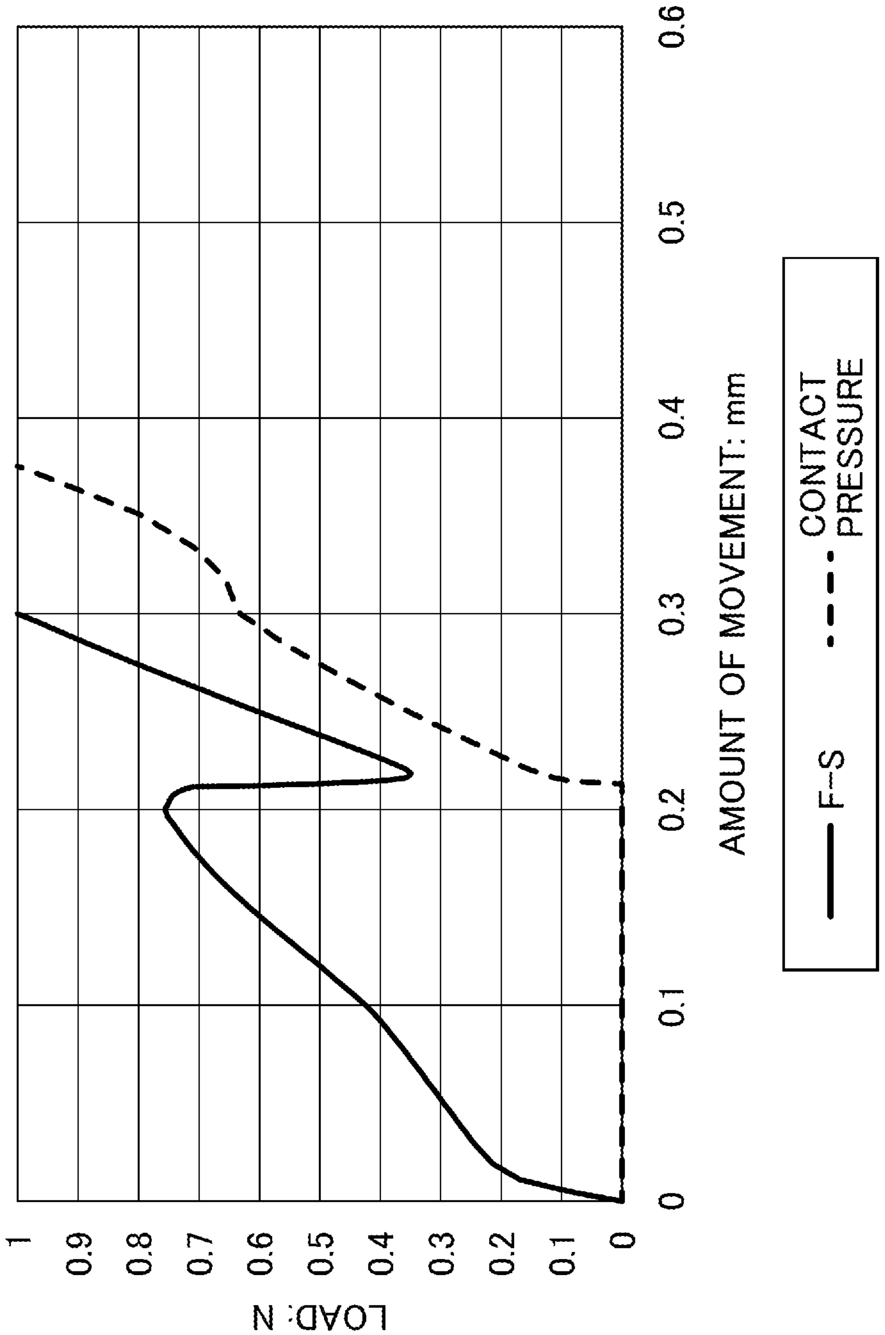
FIG. 30 is a view illustrating one example of load characteristics obtained by pressing the pressing operation body according to the sixth modified example.

FIG. 28 to FIG. 30 are each a view illustrating one example of load characteristics obtained by pressing the pressing operation body 600A according to the sixth modified example. In FIG. 28 to FIG. 30, the legend "F-S" stands for "force-stroke".

FIG. 28 illustrates load characteristics obtained by pressing the pressing operation body 600A according to the sixth modified example and change in the contact pressure of the metal contact 620 when the pressing operation body 600A according to the sixth modified example is configured as illustrated in FIG. 24 in terms of the positions and the lengths of the second projecting pressing portions 614C.

FIG. 29 illustrates load characteristics obtained by pressing the pressing operation body 600A according to the sixth modified example and change in the contact pressure of the metal contact 620 when the pressing operation body 600A according to the sixth modified example is configured as illustrated in FIG. 25 in terms of the positions and the lengths of the second projecting pressing portions 614C.

FIG. 30 illustrates load characteristics obtained by pressing the pressing operation body 600A according to the sixth modified example and change in the contact pressure of the metal contact 620 when the pressing operation body 600A according to the sixth modified example is configured as illustrated in FIG. 26 in terms of the positions and the lengths of the second projecting pressing portions 614C.

In this way, by adjusting the pressing operation body 600A according to the sixth modified example in terms of the positions of the second projecting pressing portions 614C (the distances apart from the first projecting pressing portion 614B) and the circumferential lengths of the second projecting pressing portions 614C, it is possible to adjust the load characteristics by the pressing and the change in the contact pressure of the metal contact 620.

Seventh Modified Example

Figure 31:
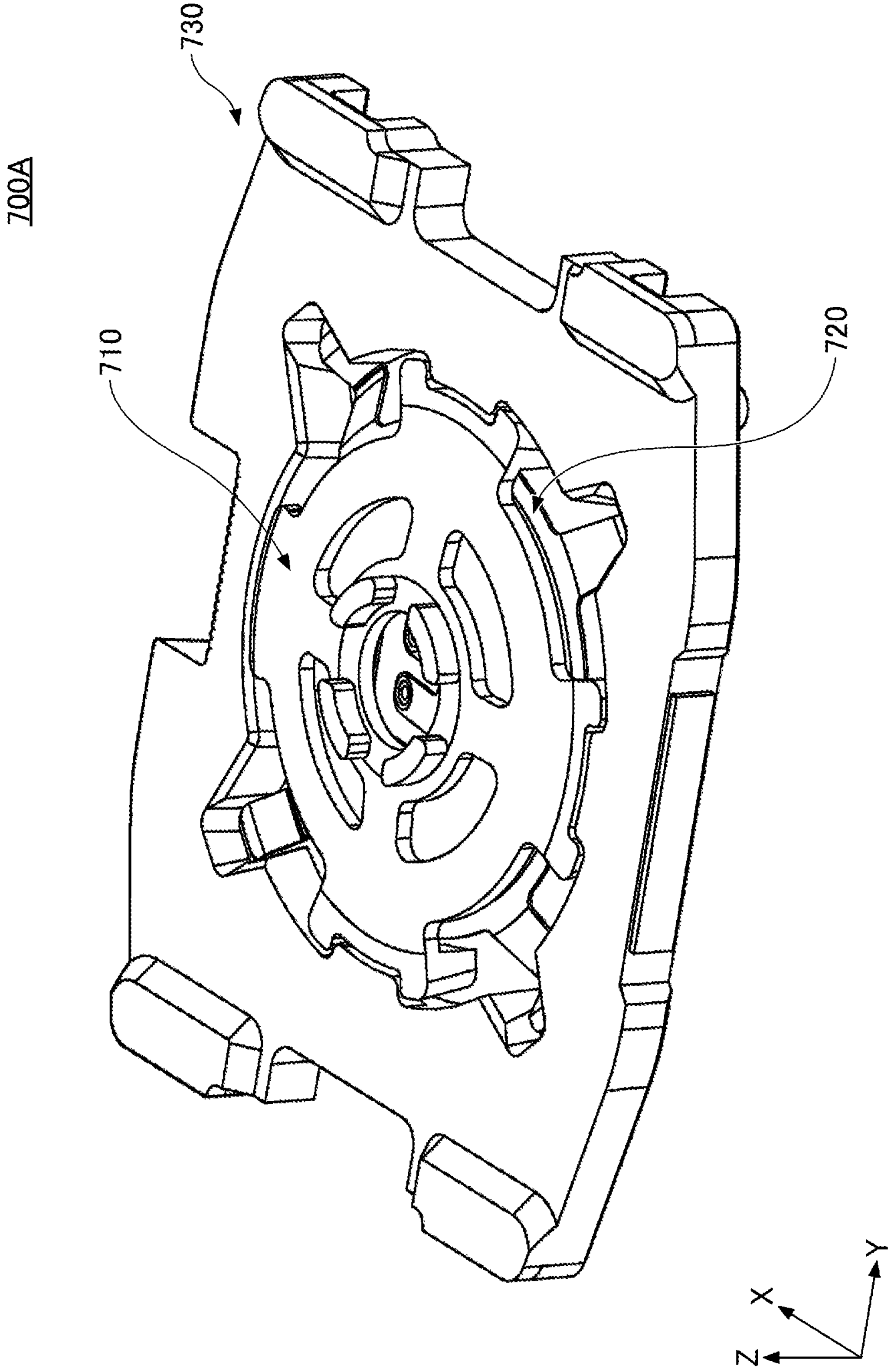
FIG. 31 is a perspective view of an outer appearance of a pressing operation body according to a seventh modified example.
Figure 32:
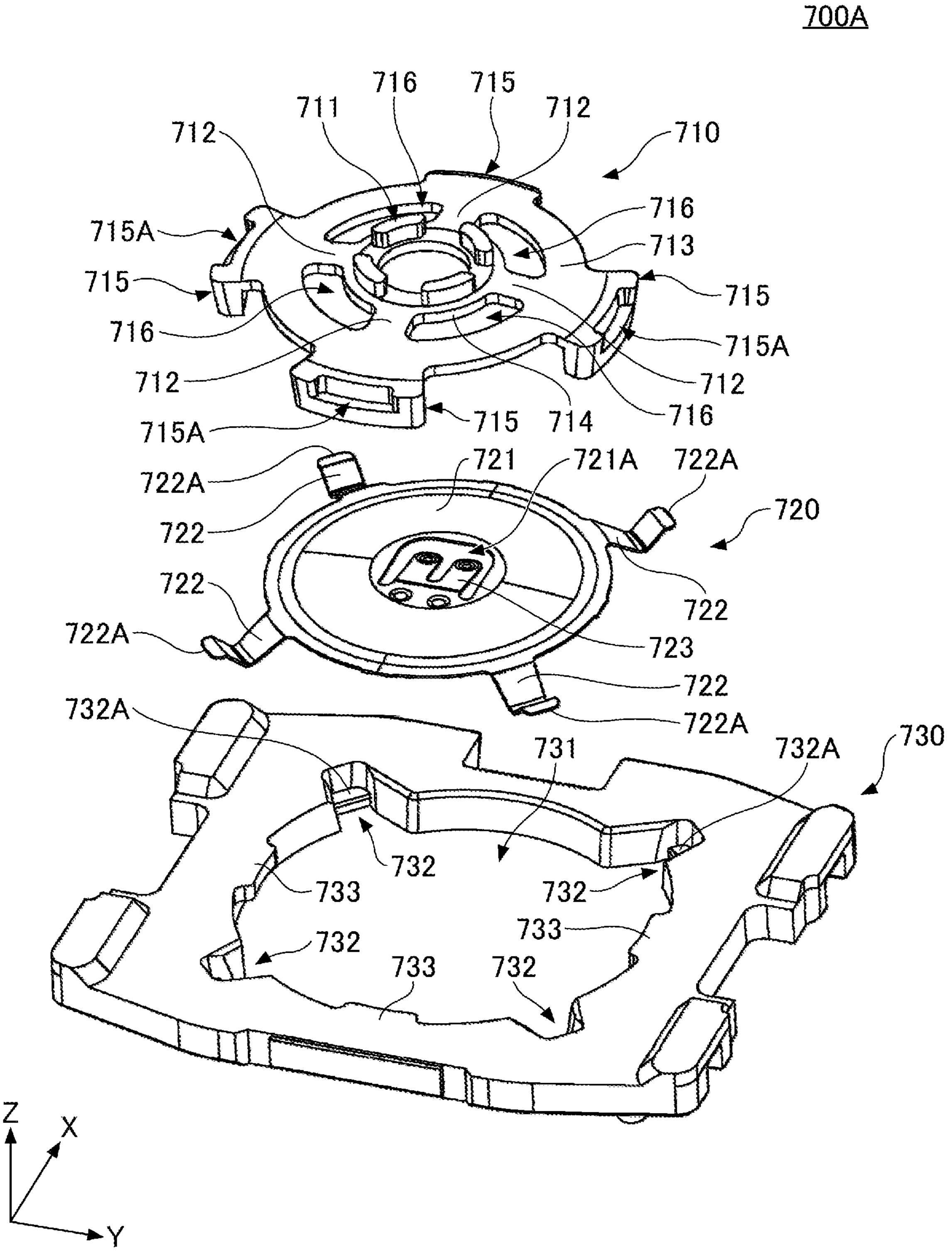
FIG. 32 is an exploded perspective view of the pressing operation body according to the seventh modified example.
Figure 33:
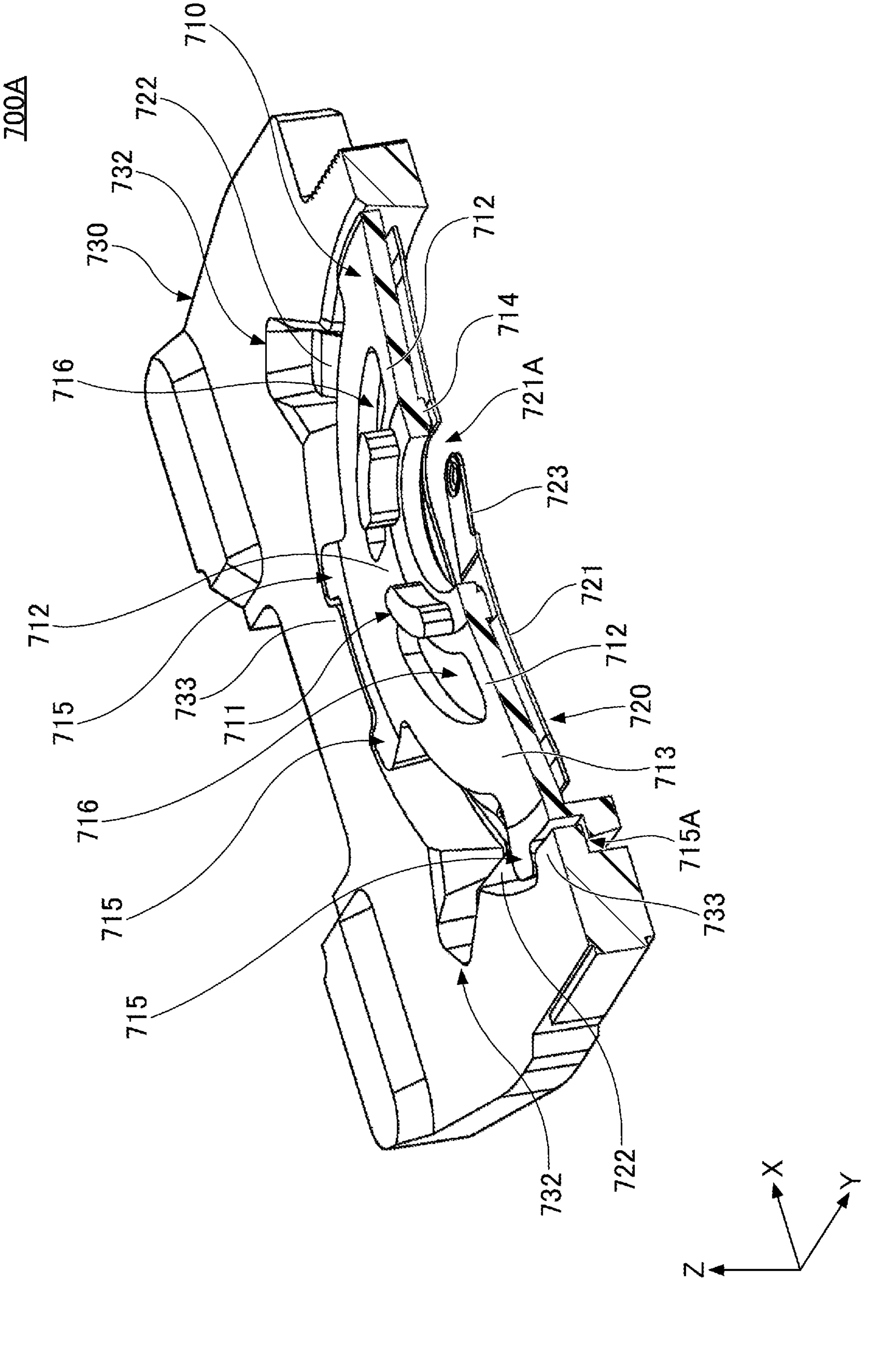
FIG. 33 is a cross-sectional view of the pressing operation body according to the seventh modified example.

Next, a seventh modified example of the switch device 100 according to one embodiment will be described with reference to FIG. 31 to FIG. 35. FIG. 31 is a perspective view of the outer appearance of a pressing operation body 700A according to the seventh modified example. FIG. 32 is an exploded perspective view of the pressing operation body 700A according to the seventh modified example. FIG. 33 is a cross-sectional view of the pressing operation body 700A according to the seventh modified example.

As illustrated in FIG. 31, the pressing operation body 700A according to the seventh modified example is thin and has an oblong rectangular shape, and thus the pressing operation body 700A can be used in, for example, an oblong rectangular key of a keyboard of a laptop.

As illustrated in FIG. 31 to FIG. 33, the pressing operation body 700A according to the seventh modified example includes a rubber stem 710, a metal contact 720, and a housing 730.

The rubber stem 710 is a member configured to be pressed downward by an operator. The rubber stem 710 is formed of an elastic material (e.g., silicone rubber). The rubber stem 710 includes an operating portion 711, four beams 712, a base portion 713, a pressing portion 714, three engaging portions 715, and four first hollowed-out portions 716. The rubber stem 710 has a flat-plate shape and is thinner than the rubber stem 130 as illustrated in FIG. 1 to FIG. 8.

The rubber stem 710 has approximately the same configuration as in the rubber stem 330 as illustrated in FIG. 12 to FIG. 15, and detailed description thereof will be omitted. However, in the rubber stem 710, the outer shape of the base portion 713 is circular in a plan view thereof from above. Also, in the rubber stem 710, the three engaging portions 715 are provided at 90-degree intervals at the outer peripheral edge of the base portion 713. Each of the engaging portions 715 is provided to project from the outer peripheral edge of the base portion 713 outward in the radial direction thereof.

The metal contact 720 is a metal plate member having a dome shape. The metal contact 720 includes a dome portion 721 and four leg portions 722.

The dome portion 721 has a circular shape in a plan view thereof and has a dome shape that projects upward. The dome portion 721 deforms downward into a recessed shape when the top (center) thereof is inverted in response to pressing via the pressing portion 714 of the rubber stem 710. Thereby, the dome portion 721 presses an unillustrated membrane switch at a rear portion of the top thereof, and it is possible to turn the membrane switch to an ON state. Note that, an opening 721A is formed at the center of the dome portion 721, and a tongue-like portion 723 is provided in the opening 721A. Thereby, the metal contact 720 can press the unillustrated membrane switch with the tongue-like portion 723.

The four leg portions 722 are disposed at 90-degree intervals at the outer peripheral edge of the dome portion 721. Each of the four leg portions 722 is provided to have a certain width and project outward, in the radial direction, of the outer peripheral edge of the dome portion 721. The leg portion has a shape that is folded in a V shape in a lateral view thereof.

The housing 730 is a resin flat-plate member. The housing 730 has an approximately oblong rectangular shape in a plan view thereof from above. An opening 731 is formed at the center of the housing 730. The opening 731 has, in a plan view thereof from above, a circular shape that is slightly larger than the dome portion 721 of the metal contact 720. The housing 730 includes four retaining portions 732. The four retaining portions 732 are disposed at 90-degree intervals at the outer peripheral edge of the opening 731. Each of the four retaining portions 732 is cut out outward, in the radial direction, of the outer peripheral edge of the opening 731 so as to have a certain width. A horizontal flat placement surface 732A is provided in a bottom portion in the retaining portion 732.

Retention by the Housing 730

Figure 34:
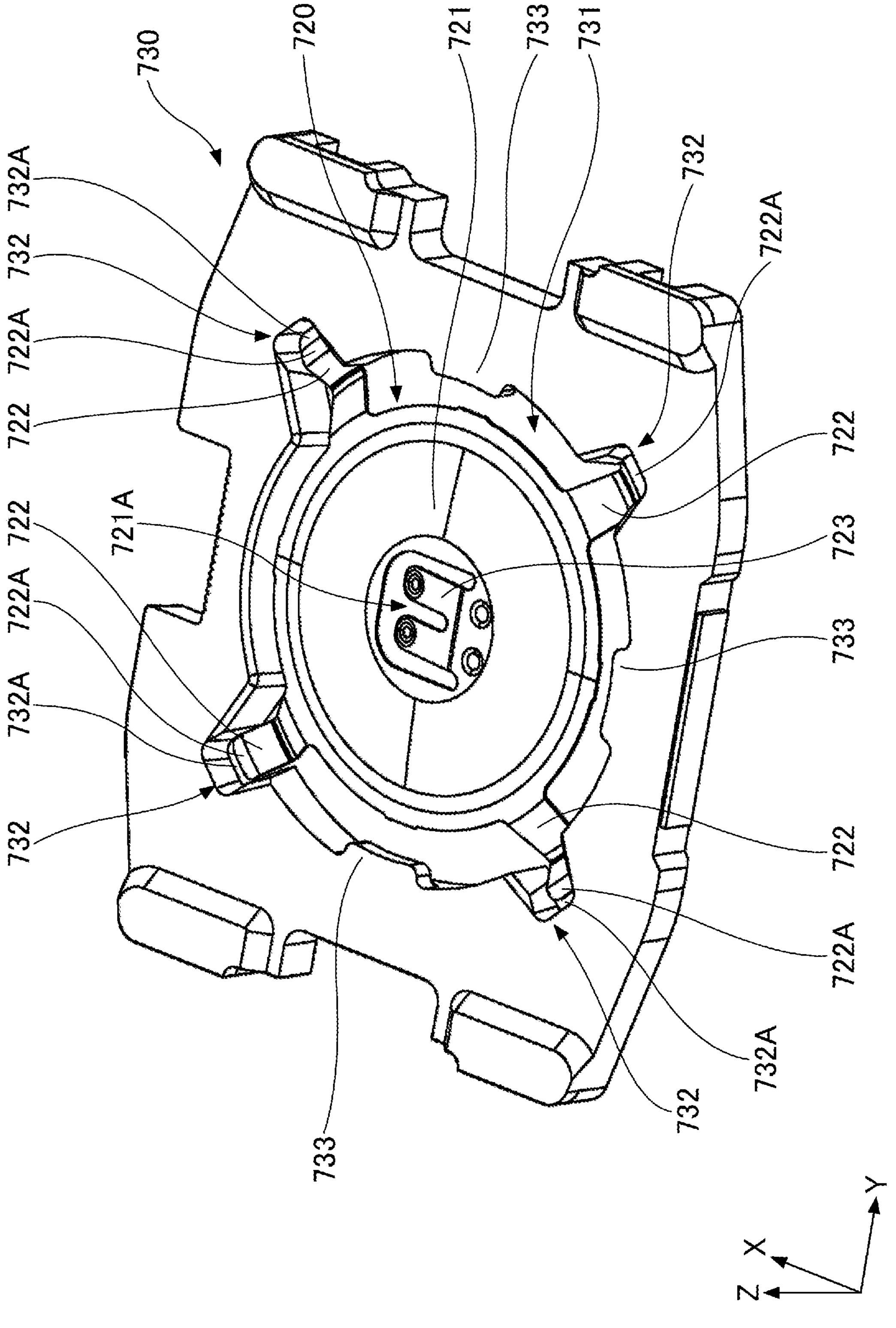
FIG. 34 is an explanatory view of retention by a housing included in the pressing operation body according to the seventh modified example.
Figure 35:
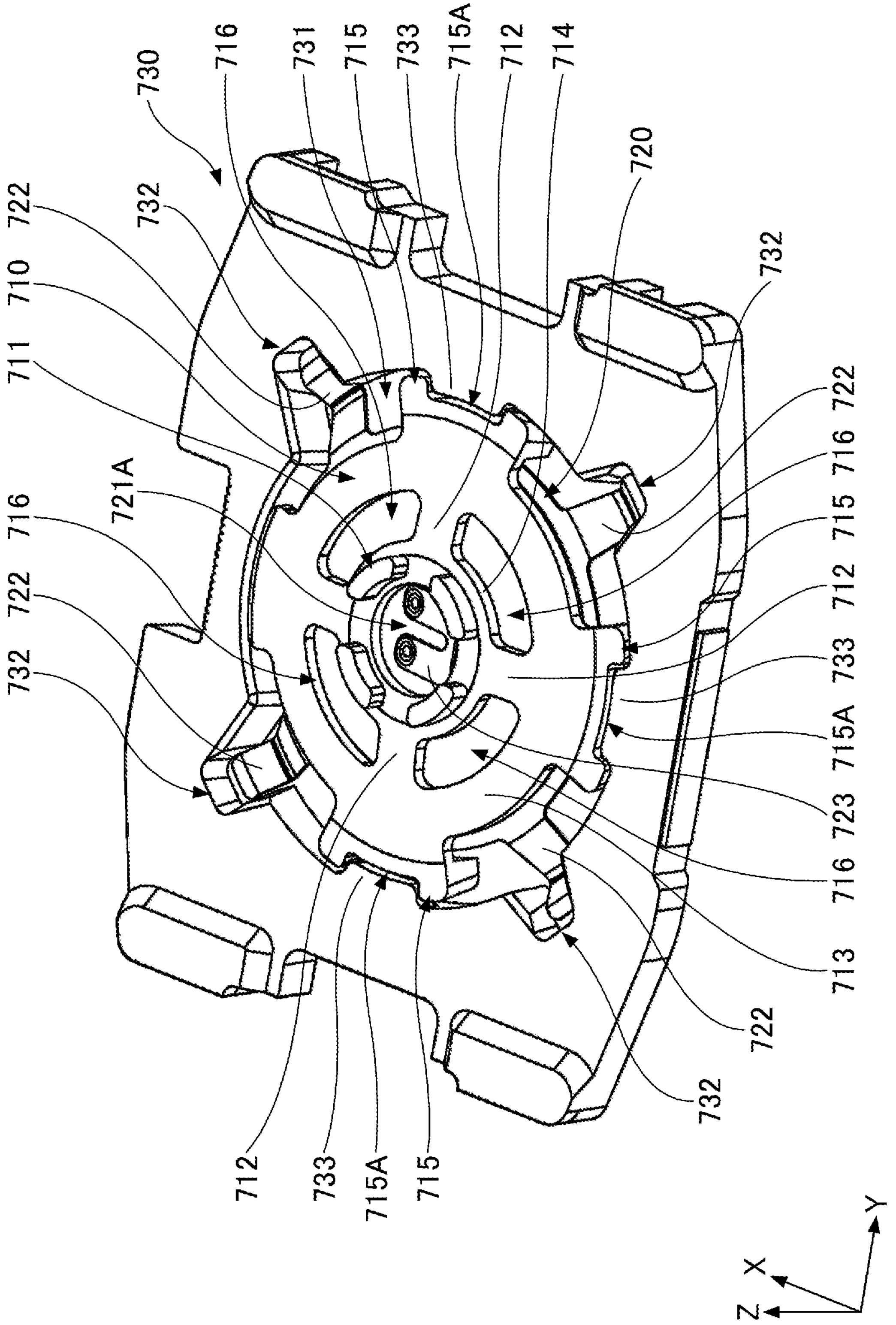
FIG. 35 is an explanatory view of retention by the housing included in the pressing operation body according to the seventh modified example.

FIG. 34 and FIG. 35 are each an explanatory view of retention by the housing 730 included in the pressing operation body 700A according to the seventh modified example. FIG. 34 illustrates the housing 730 in a state of retaining the metal contact 720. FIG. 35 illustrates the housing 730 in a state of retaining the rubber stem 710 and the metal contact 720.

The rubber stem 710 and the metal contact 720 are disposed in the opening 731 of the housing 730 in a state where the metal contact 720 is stacked on the lower portion of the rubber stem 710.

Specifically, first, as illustrated in FIG. 34, the metal contact 720 is disposed in the opening 731 of the housing 730. At this time, the four leg portions 722 of the metal contact 720 are fitted into the four retaining portions 732 formed in the housing 730, and tips 722A of the leg portions 722 are placed at the placement surfaces 732A provided in the retaining portions 732. Thereby, the metal contact 720 is disposed at a predetermined height in the opening 731 of the housing 730, and in this state, the metal contact 720 is retained (supported from thereunder) by the housing 730 at the four leg portions 722.

Subsequently, as illustrated in FIG. 35, the rubber stem 710 is disposed above the metal contact 720 in the opening 731 of the housing 730. At this time, three engaging projections 733 provided inward, in the radial direction, of the circumferential edge of the opening 731 in the housing 730 are fitted into recessed portions 715A of the three engaging portions 715 provided in the rubber stem 710. Thereby, the rubber stem 710 is disposed at a predetermined height in the opening 731 of the housing 730, and in this state, the rubber stem 710 is retained by the housing 730 at the three engaging portions 715.

Note that, when the rubber stem 710 is retained by the housing 730, the opening 731 of the housing 730 is covered with the rubber stem 710. This restricts upward movement of the metal contact 720 so that the metal contact 720 does not move upward from the opening 731 of the housing 730.

According to one embodiment, it is possible to reduce the number of parts of the switch device including the inversion spring and the rubber dome.

What is claimed is:

1. A pressing operation body, comprising:
an inversion spring having a dome shape; and
a rubber stem configured to bend in response to pressing and press the inversion spring, wherein
the inversion spring includes
a dome portion, and
a plurality of leg portions that are extended outward from an outer peripheral edge of the dome portion, and
the rubber stem includes
a base portion configured to support a lower edge of the rubber stem, and
the base portion includes
a plurality of retaining portions configured to retain the plurality of leg portions of the inversion spring,
wherein the leg portions each include
a folded portion that is folded in a V shape after the leg portion is extended outward and downward from the outer peripheral edge of the dome portion, and
wherein the leg portions are each extended outward and upward from the folded portion, and a tip of the leg portion is disposed in the retaining portion,
wherein the retaining portions each include
a support portion configured to support the tip of the leg portion disposed in the retaining portion from under the tip,
wherein the support portion is a pair of projecting portions that are provided to project in the retaining portion, are elastically deformable, and face each other,
wherein the pair of projecting portions have a gap between the pair of projecting portions, and
wherein a tip of each of the projecting portions has a tilt surface that is tilted such that a width of the gap becomes gradually narrower in an upward direction.

2. The pressing operation body according to claim 1, wherein
the retaining portions each have a shape that is formed by cutting out a part of the base portion.

3. The pressing operation body according to claim 1, wherein
the retaining portions retain the leg portions so as to be movable in the retaining portions in response to the pressing.

4. The pressing operation body according to claim 1, wherein
the rubber stem includes
an operating portion configured to be pressed, and
a first hollowed-out portion that is formed in the base portion outward of the operating portion.

5. The pressing operation body according to claim 4, wherein
the rubber stem includes a plurality of first hollowed-out portions that are circularly disposed so as to enclose the operating portion in the base portion.

6. The pressing operation body according to claim 5, wherein the rubber stem includes a plurality of elastic wall portions that are circularly disposed on an upper portion of the operating portion, the elastic wall portions each being elastically deformable in response to the pressing, and the first hollowed-out portions are each disposed outward in a same radial direction as in one of the elastic wall portions that corresponds to the first hollowed-out portion, and the first hollowed-out portions each have a width equal to or more than a width of one of the elastic wall portions that corresponds to the first hollowed-out portion.

7. The pressing operation body according to claim 4, wherein the rubber stem includes a second hollowed-out portion inward of the operating portion in the base portion.

8. The pressing operation body according to claim 4, wherein the rubber stem includes an elastic wall portion on an upper portion of the operating portion, the elastic wall portion being elastically deformable in response to the pressing.

9. The pressing operation body according to claim 1, further comprising:

a protective sheet that is stacked on a lower surface of the inversion spring, wherein the protective sheet includes a projecting portion that is stacked on a lower surface of the leg portion of the inversion spring, and the leg portion of the inversion spring is retained by the retaining portion, with the projecting portion of the protective sheet being stacked on the lower surface of the leg portion of the inversion spring.

10. The pressing operation body according to claim 1, further comprising:

a projection that is disposed below a top of the inversion spring.

11. The pressing operation body according to claim 10, further comprising:

a protective sheet that is stacked on a lower surface of the inversion spring, wherein the pressing operation body is adhesively provided on a rear surface of the protective sheet.

12. The pressing operation body according to claim 11, wherein the pressing operation body has an oblong rectangular shape in a plan view of the pressing operation body.

13. The pressing operation body according to claim 1, wherein the rubber stem includes a first projecting pressing portion, and a pair of second projecting pressing portions, wherein the first projecting pressing portion is at a center in a plane facing a top of the inversion spring, and the second projecting pressing portions are provided at a peripheral portion in the plane so as to sandwich the first projecting pressing portion between the second projecting pressing portions.

14. The pressing operation body according to claim 13, wherein the first projecting pressing portion is configured to press a center of the top of the inversion spring, and the second projecting pressing portions are each configured to press a peripheral portion of the top of the inversion spring.

15. The pressing operation body according to claim 14, wherein an amount of projection of the second projecting pressing portions is larger than an amount of projection of the first projecting pressing portion.

16. The pressing operation body according to claim 13, wherein the pressing operation body has an oblong rectangular shape in a plan view of the pressing operation body.

17. A switch device, comprising:

the pressing operation body according to claim 1; and a membrane switch that is disposed below the pressing operation body and turned to an ON state in response to inversion of the inversion spring.

* * * * *